(12) United States Patent
O'Connell

(10) Patent No.: US 10,450,137 B2
(45) Date of Patent: Oct. 22, 2019

(54) ROTATING VERTICAL STORAGE SYSTEM FOR BARRELS

(71) Applicant: Brian O'Connell, Huntersville, NC (US)

(72) Inventor: Brian O'Connell, Huntersville, NC (US)

( * ) Notice: Subject to any disclaimer, the term of this patent is extended or adjusted under 35 U.S.C. 154(b) by 168 days.

(21) Appl. No.: 15/526,669

(22) PCT Filed: Dec. 3, 2015

(86) PCT No.: PCT/IB2015/059307
§ 371 (c)(1),
(2) Date: May 12, 2017

(87) PCT Pub. No.: WO2016/088070
PCT Pub. Date: Jun. 9, 2016

(65) Prior Publication Data
US 2018/0282062 A1    Oct. 4, 2018

Related U.S. Application Data

(60) Provisional application No. 62/196,610, filed on Jul. 24, 2015, provisional application No. 62/161,931, (Continued)

(51) Int. Cl.
*B65G 1/127* (2006.01)
*B65G 1/06* (2006.01)
*B65G 17/38* (2006.01)

(52) U.S. Cl.
CPC .............. *B65G 1/127* (2013.01); *B65G 1/06* (2013.01); *B65G 17/38* (2013.01); *B65G 2201/0241* (2013.01)

(58) Field of Classification Search
CPC ............ B65G 1/127; B65G 1/06; B65G 17/38
(Continued)

(56) References Cited

U.S. PATENT DOCUMENTS 268,748 A * 12/1882 Stewart ..................... E04H 1/04
52/30
487,765 A * 12/1892 Ormerod .............. A47B 81/007
211/85.22
(Continued)

FOREIGN PATENT DOCUMENTS

EP          0587244 A1    3/1994
JP          05097213 A  *  4/1993

*Primary Examiner* — Stanton L Krycinski
(74) *Attorney, Agent, or Firm* — Patentfile, LLC; Bradley C. Fach; Steven R. Kick

(57) ABSTRACT

A rotating vertical storage system for barrels is provided. The system may comprise a first vertical support tower and a second vertical support tower. A first vertical support tower may have a first upper sprocket wheel and a first lower sprocket wheel with a first carrier chain rotationally coupled to the upper and lower first sprocket wheels. A second vertical support tower may have a second upper sprocket wheel and a second lower sprocket wheel with a second carrier chain rotationally coupled to the upper and lower second sprocket wheels. The system may further include a first cradle with a first end coupled to the first carrier chain and with a second end coupled to the second carrier chain. The cradle may comprise a plurality of barrel receiving valleys adapted to removably secure a plurality of barrels such as kegs.

15 Claims, 23 Drawing Sheets

Related U.S. Application Data filed on May 15, 2015, provisional application No. 62/116,465, filed on Feb. 15, 2015, provisional application No. 62/087,737, filed on Dec. 4, 2014.

(58) Field of Classification Search
USPC .............................................. 211/1.55, 85.22
See application file for complete search history.

(56) References Cited

U.S. PATENT DOCUMENTS

| | | | | |
|---|---|---|---|---|
| 592,203 A * | 10/1897 | Martin | ...................... | A47F 5/03 211/164 |
| 1,680,035 A * | 8/1928 | Buckingham | ............. | A47F 3/08 211/121 |
| 1,887,245 A * | 11/1932 | Murray | ..................... | E04H 6/14 414/251 |
| 1,938,126 A * | 12/1933 | Thompson | .............. | A47F 7/288 211/85.22 |
| 2,442,070 A * | 5/1948 | Bouchard | ................. | A47F 3/08 108/149 |
| 2,703,643 A * | 3/1955 | Parsons | ................ | A47B 63/067 198/798 |
| 2,704,614 A * | 3/1955 | St. John | ................... | A21B 3/18 198/404 |
| 2,726,753 A * | 12/1955 | Bee | .......................... | B65G 1/06 211/122 |
| 3,199,658 A * | 8/1965 | Graber | ................. | A47B 63/067 198/800 |
| 3,365,052 A * | 1/1968 | Kornylak | ............... | B65G 1/127 198/477.1 |
| 3,476,260 A * | 11/1969 | Jay | ....................... | A47B 81/007 108/53.1 |
| 3,664,482 A * | 5/1972 | Kornylak | ............. | B65G 17/123 198/802 |
| 4,009,919 A * | 3/1977 | Raasch | .................. | B65H 49/38 312/223.6 |
| 4,314,647 A * | 2/1982 | Harris | .................... | B65G 1/127 198/798 |
| 4,391,377 A * | 7/1983 | Ziaylek, Jr. | .......... | A47B 81/007 206/443 |
| 4,488,649 A * | 12/1984 | Mark | .................... | A47B 81/007 206/391 |
| 4,643,495 A * | 2/1987 | Pepping | ................. | B65G 1/127 198/800 |
| 4,676,560 A * | 6/1987 | Schmitz | ................. | B65G 1/127 198/794 |
| 4,877,121 A * | 10/1989 | Yamashita | ............. | B65G 1/127 198/475.1 |
| 5,108,163 A * | 4/1992 | Nakatsu | ................. | B65G 1/127 312/268 |
| 5,168,696 A * | 12/1992 | Stahlecker | ........... | B65H 67/064 198/418.6 |
| 5,273,392 A * | 12/1993 | Bernard, II | .......... | B65G 1/0485 198/341.04 |
| 5,374,149 A * | 12/1994 | Lichti | ....................... | E04H 6/14 198/800 |
| 6,341,931 B1 * | 1/2002 | Bates | ..................... | B65G 1/127 211/1.55 |
| 6,854,815 B1 * | 2/2005 | Smith | .................. | A47B 49/008 198/802 |
| 7,278,532 B2 * | 10/2007 | Martin | ................... | B65G 1/127 198/799 |
| 7,448,505 B2 * | 11/2008 | DeMent | .................... | B60P 7/12 211/59.4 |
| 7,641,059 B2 * | 1/2010 | Gracia Lecina | ......... | B65G 1/14 211/194 |
| 7,708,155 B2 * | 5/2010 | DeMent | ................... | B60P 7/12 211/59.4 |
| 7,811,042 B1 * | 10/2010 | Menendez | ............. | B65G 1/127 198/799 |
| 8,733,860 B1 * | 5/2014 | Burke | ...................... | A47F 5/03 312/134 |
| 9,546,021 B2 * | 1/2017 | Stover | ...................... | B65G 1/04 |
| 2011/0017686 A1 * | 1/2011 | Burra | ................... | A47B 81/007 211/71.01 |
| 2012/0318763 A1 * | 12/2012 | Garton | ..................... | B62B 3/16 211/85.22 |
| 2013/0216339 A1 | 8/2013 | Apps et al. | | |
| 2013/0293071 A1 * | 11/2013 | Forster | ................ | B41F 13/0016 312/72 |
| 2016/0058182 A1 * | 3/2016 | Langston | ........... | A47B 47/0091 211/85.22 |
| 2016/0113396 A1 * | 4/2016 | Wilhelmsen | ......... | A47B 81/007 211/72 |

* cited by examiner

ROTATING VERTICAL STORAGE SYSTEM FOR BARRELS

CROSS REFERENCE TO RELATED APPLICATIONS

This Application is a 35 U.S.C. 371 National Stage Entry of International Application No. PCT/M2015/059307 filed on Dec. 3, 2015, which claims the benefit of U.S. provisional patent application Nos. 62/087,737, filed on Dec. 4, 2014, 62/116,465, filed on Feb. 15, 2015, 62/161,931, filed on May 15, 2015, and 62/196,610, filed on Jul. 24, 2015, the entire disclosures of which are incorporated by reference herein.

FIELD OF THE INVENTION

This patent specification relates to the field of vertical storage systems for barrels such as kegs and other items. More specifically, this patent specification relates to new systems and devices for storing and rotating keg barrels and the like to maximize valuable warehouse floor space.

BACKGROUND

Over the past several years the explosion in Stock/Shelf Keeping Units (SKUs) has added considerable costs to beverage distributors supply chains. This explosion has created increase operational costs relating to efficiencies around storing and picking product in warehouses. The SKU explosion is especially affects those roles and processes requiring continuous physical work methods i.e. warehouse picking & load building.

For decades direct store delivery (DSD) distribution consisted of handling a few produced products for distribution. In past years when a few additional brands and package innovations were introduced to a distributors supply chain the additional SKU's were usually managed well within the warehouse.

In the last decade, market demands forced an unprecedented expansion of more product categories and packages driving SKU complexity within the warehouse, constraining the traditional supply chain processes and storage systems. The ability to handle the number of increasing SKUs in a warehouse has become a challenge within itself.

One particular challenge within a distributor's warehouse is the ability to store & pick beer kegs effectively in efficiently. Currently beer distributors place barrel kegs on a static storage racks/shelf to be stored and picked at a later time. The unique characteristics of a half kegs with a weigh of approximately 165 lbs. and a width of 16" and a height of 24" make the handling of kegs particularly challenging. Warehouse pickers can only safely "pick" this heavy SKU's from approximately 1.6-4.5 feet off the ground without the use of additional equipment. Any higher pick location would prove to be unsafe from an ergonomic perspective. Given this physical constraint the number of dedicated pick locations needed for the growing number of SKU's requires a distributor to utilize a large amount of square footage to accommodate the needed pick locations thus driving additional operational costs.

Therefore, a need exists for an effective and efficient means to store and pick heavy kegs, barrels, drums, Co2 containers etc. without the use of additional equipment such as a fork-lift truck and in a safe ergonomic manner.

BRIEF SUMMARY OF THE INVENTION

A rotating vertical storage system for barrels is provided. In some embodiments, the system may comprise a first vertical support tower and a second vertical support tower. A first vertical support tower may have a first upper sprocket wheel and a first lower sprocket wheel with a first carrier chain rotationally coupled to the upper and lower first sprocket wheels. A second vertical support tower may have a second upper sprocket wheel and a second lower sprocket wheel with a second carrier chain rotationally coupled to the upper and lower second sprocket wheels. The system may further include a first cradle with a first end coupled to the first carrier chain and with a second end coupled to the second carrier chain. The cradle may comprise a plurality of barrel receiving valleys adapted to removably secure a plurality of barrels. A motor may be operably connected to the first carrier chain and configured to rotate the first carrier chain and first cradle in a vertical direction.

In further embodiments, the system may comprise a plurality of barrels removably secured within the plurality of barrel receiving valleys, with the plurality of barrels vertically oriented relative to each other and the system may be configured to vertically rotate each of the cradles in a vertical direction allowing the cradles to be moved generally closer to or farther from a floor surface supporting the system.

According to one aspect consistent with the principles of the invention, a method for vertically storing a plurality of barrels is provided. The method may include: providing a first vertical support tower secured to a ground surface and having a first upper sprocket wheel and a first lower sprocket wheel with a first carrier chain rotationally coupled to said upper and lower first sprocket wheels; providing a second vertical support tower secured to the ground surface and having a second upper sprocket wheel and a second lower sprocket wheel with a second carrier chain rotationally coupled to said upper and lower second sprocket wheels; providing a first cradle with a first end coupled to said first carrier chain and with a second end coupled to said second carrier chain, said first cradle comprising a plurality of barrel receiving valleys adapted to removably secure a plurality of barrels; providing a motor operably connected to the first carrier chain of said first vertical support tower; placing a first barrel into a first barrel receiving valley of the first cradle wherein said first cradle is at a first height above the ground surface; and causing the motor to rotate the first carrier chain of said first vertical support tower and said first cradle so that said first cradle is moved to a second height above the ground surface.

BRIEF DESCRIPTION OF THE DRAWINGS

Some embodiments of the present invention are illustrated as an example and are not limited by the figures of the accompanying drawings, in which like references may indicate similar elements and in which.

LISTING OF ELEMENTS IN THE FIGURES

Figure 1:
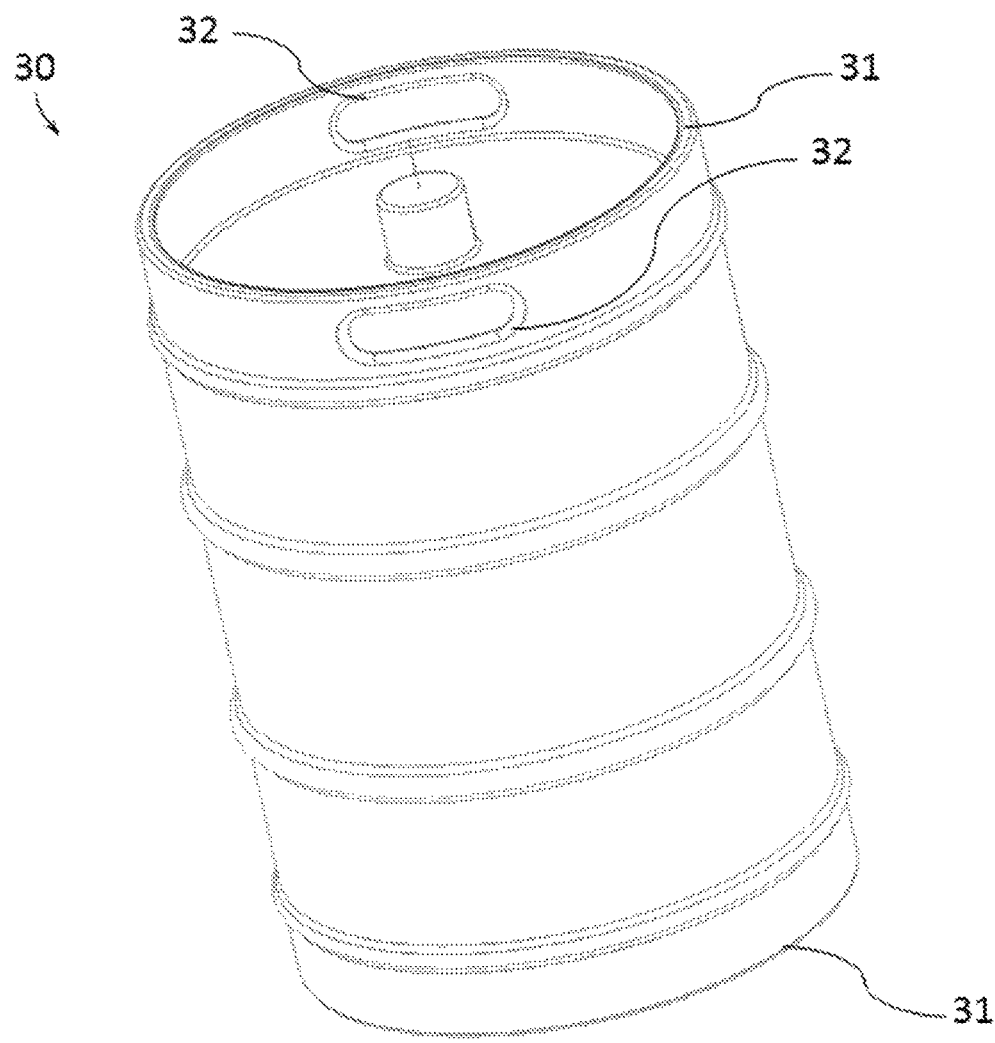
FIG. 1 depicts a top perspective view of an example of a keg barrel according to various embodiments described herein.

| | |
|---|---|
| (11) lip | (32) Barrel Handle |
| (12) Cradle Barrel Glide | (33) rounded wall |
| (13) front cradle bar | (41) Cradle |
| (13A) Front Curved Barrel Cradle Bar | (42) barrel receiving valley |
| (13B) Front Straight Barrel Cradle Bar | (43) first end of cradle |
| (14A) Center Curved Barrel Cradle Bar | (44) second end of cradle |
| (14B) Center Straight Barrel Cradle Bar | (50) rotating Vertical Storage System |
| (15A) Back Curved Barrel Cradle Bar | (55) back restraint member |
| (15B) Back Straight Barrel Cradle Bar | (55A) back depression |
| (16) Horizontal Cradle Member | (56) lateral perimeter wall |
| (18) Cradle Load Pin | (60) Carrier Load Plate |
| (20) Front Barrel Retention Bar | (61) Front Carrier Load Bar |
| (20A) Front Barrel Retention Bar | (62) Back Carrier Load Bar |
| (20B) Front Barrel Retention Bar | (63) Top Lateral Barrel Restraint |
| (20C) Front Barrel Retention Bar | (64) Lateral Barrel Restraint |
| (20D) Front Barrel Retention Bar | (65) Back Restraint Plate |
| (20E) Front Barrel Retention Bar | (65A) Back Adjustable Restraint Plate Handle |
| (20F) Front Barrel Retention Bar | (66A) Front Receiver Slot |
| (22) motor | (66B) Middle Receiver Slot |
| (24) support tab | (66C) Back Receiver Slot |
| (25) front restraint member | (67A) front Restraint Plate |
| (30) Keg Barrel | (67B) back restraint plate |
| (31) Barrel Rim | (68) Flexible Restraint line |
| (72) Vertical Plain | (70) Horizontal Plain |
| (73) Cradle Apparatus Bottom | (71) Angled Plain |
| (74) Outer Keg Dimension | (105B) Second Transverse Beam |
| (75) Carrier Lock Nut | (110A) First Carrier Chain |
| (76) Carrier Flat Washer | (110B) Second Carrier Chain |
| (77) Carrier Bushing | (121A) First upper Sprocket Wheel |
| (78) Carrier Bolt | (121B) Second upper Sprocket Wheel |
| (79) Carrier Coupling Plate | (125A) First lower Sprocket Wheel |
| (79A) Carrier Coupling Plate Slot | (125B) Second lower Sprocket Wheel |
| (80) Barrel Carrier Platform | (123A) First Top Mounting Shaft |
| (81) Side Containment Bar | (123B) Second Top Mounting Shaft |
| (82) Back Barrel Containment Plate | (124A) Bottom First Mounting Shaft |
| (83A) Top Curved Barrel Containment Bar | (124B) Bottom Second Mounting Shaft |
| (83B) Center Curved Barrel Containment Bar | (151) first vertical support tower |
| (83C) Bottom Curved Barrel Containment Bar | (152) second vertical support tower |
| (101A) Front First Vertical Frame Member | (300) Ground surface |
| (101B) Back First Vertical Frame Member | (400A) First Barrel Position |
| (102A) Front Second Vertical Frame Member | (400B) Second Barrel Position |
| (102B) Back Second Vertical Frame Member | (400C) Third Barrel Position |
| (103A) First Front Support Leg | (400D) Forth Barrel Position |

-continued (103B) First Back Support Leg
(104A) Second Front Support Leg
(104B) Second Back Support Leg
(105A) First Transverse Beam
(400J) Tenth Barrel Position
(400K) Eleventh Barrel Position
(400L) Twelfth Barrel Position
(400E) Fifth Barrel Position
(400F) Sixth Barrel Position
(400G) Seventh Barrel Position
(400H) Eighth Barrel Position
(400I) Ninth Barrel Position

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A new vertical storage system pertaining to kegs, barrels, drums, beverage containers (referred to herein as "barrels" or "keg barrel") is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
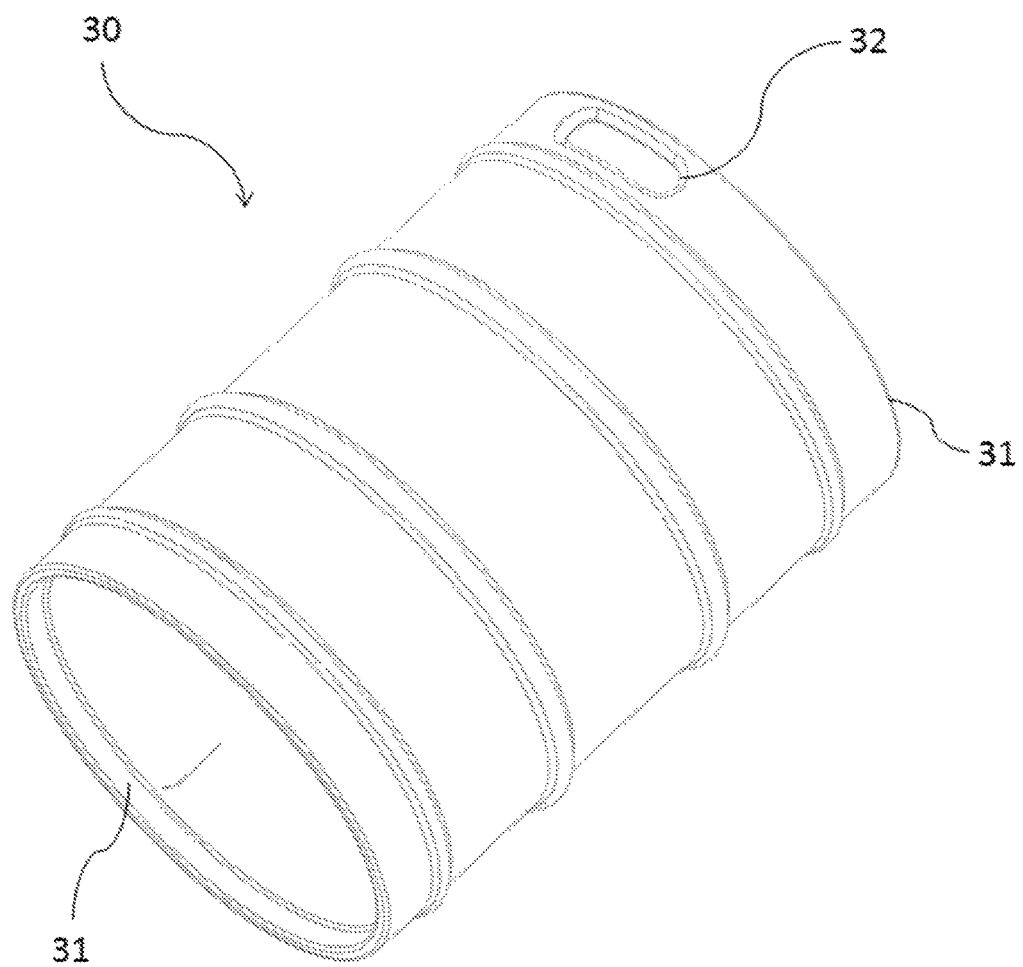
FIG. 2 illustrates a bottom perspective view of an example of a keg barrel according to various embodiments described herein.

The present invention will now be described by example and through referencing the appended figures representing preferred and alternative embodiments. FIG. 1 shows a top perspective view of a keg barrel 30 that is represented with an upper rim 31 which may comprise one or more, such as two, keg handles 32 at one end of the keg barrel 30. FIG. 2 illustrates a bottom perspective view of a keg barrel 30 with a protruding keg lower rim 31. Generally, a barrel 30 may comprise a rounded wall 33 with a first or upper rim 31 coupled to the top of the rounded wall 33 and with a second or lower rim 31 coupled to the bottom of the rounded wall 33. Although standard keg barrels are depicted in some of the examples and figures, other types and sizes of barrels are contemplated herein.

Turning now to FIGS. 3-7 and 13-16 a cradle 41 of a rotating vertical storage system 50 may comprise one or more barrel receiving valleys 42 allowing the cradle 41 to function as a carrier of one or more barrels 30. Each barrel receiving valley 42 may be adapted to removably secure a barrel 30 allowing the rotating vertical storage system 50 to removably secure one, two three, four, five, six, seven, eight, or more, such as a plurality, of barrels 30 in a cradle 41. In further embodiments, a rotating vertical storage system 50 may comprise one, two three, four, five, six, seven, eight, or more, such as a plurality, of cradles 41 with each cradle 41 comprising one or more barrel receiving valleys 42. In some embodiments, a barrel receiving valley 42 may be "u" shaped, "v" shaped or other suitable shapes and sizes to receive a barrel 30 or other storable item. In yet other embodiments, a barrel receiving valley 42 may be round, oval, square shaped and may include round or circular (or other shaped) cavities formed within a rotating shelf and configured to receive a barrel 30.

Figure 3:
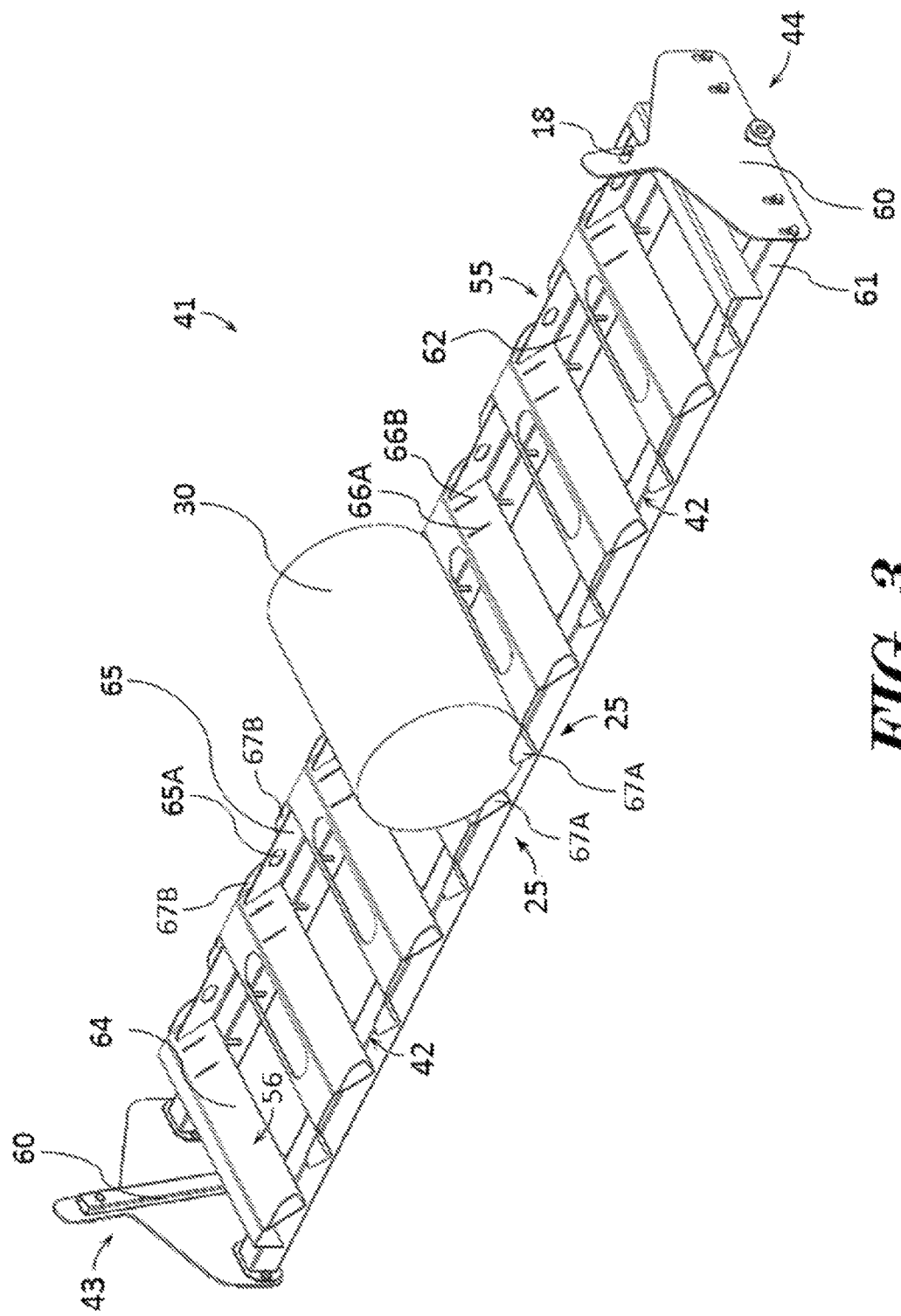
FIG. 3 shows a front perspective view of an example of a cradle with one keg barrel located in one barrel receiving valley of a vertical storage system according to various alternative embodiments described herein.

FIG. 3 represents a front perspective view an example of a cradle 41 of a rotating vertical storage system 50 (FIGS. 13-16) for barrels 30 in accordance with preferred embodiments. In this example the cradle 41 preferably comprises; a front carrier load bar 61 and a back carrier load bar 62 that are parallel to each other. Each carrier load bar 61/62 is attached to a carrier load plate 60 at distal ends 43, 44, making up the frame of the cradle 41. The cradle 41 is preferably designed with a lateral barrel restraint(s) 64 to prevent a keg barrel 30 from moving side to side in a lateral direction. In this embodiment, a back restraint plate 67B and front restraint plate 67A is used to accommodate a Quarter Barrel size design which is a popular type or size of keg barrel 30. In further embodiments, one or both restraint plates 67A, 67B, may be optional depending on the size of the keg barrels 30. For example, a back restraint plate 67B may not be needed for Sixth size keg barrels 30 and/or for Half size keg barrels, while a back restraint plate 67B may be used for Quarter size keg barrels 30. It is understood that this back containment element such as the back restraint plate 67B can be fixed in alternative designs. In some embodiments and as shown by FIG. 5, the lateral barrel restraints 64 may be configured with angled or contoured sidewalls suitable for making contact with a keg barrel 30 and preventing the lateral or side to side movement of the keg barrel 30 while being transported in the cradle 41.

Figure 5:
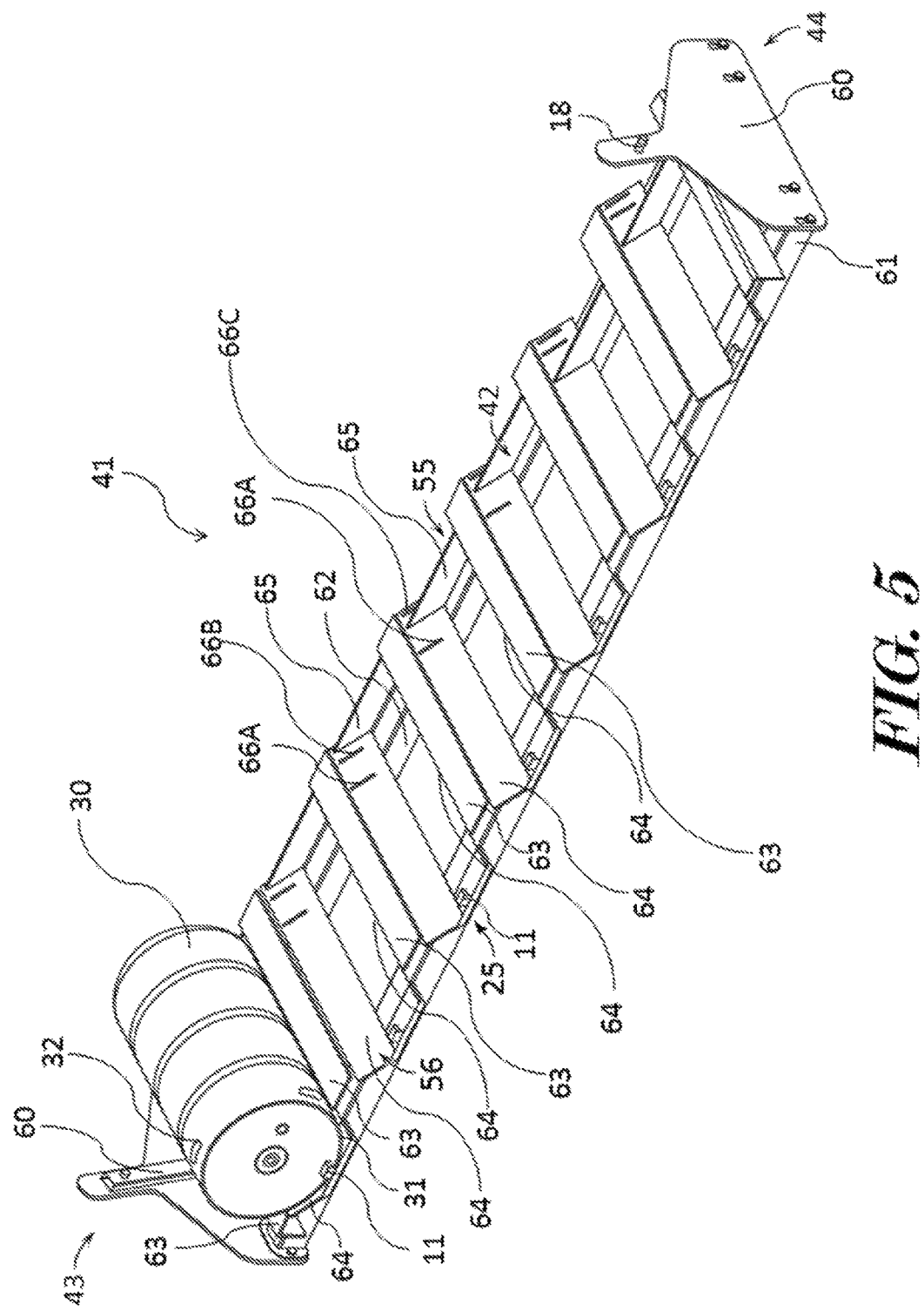
FIG. 5 illustrates a perspective view of an example of a cradle of a vertical storage system according to preferred embodiments described herein.
Figure 6:
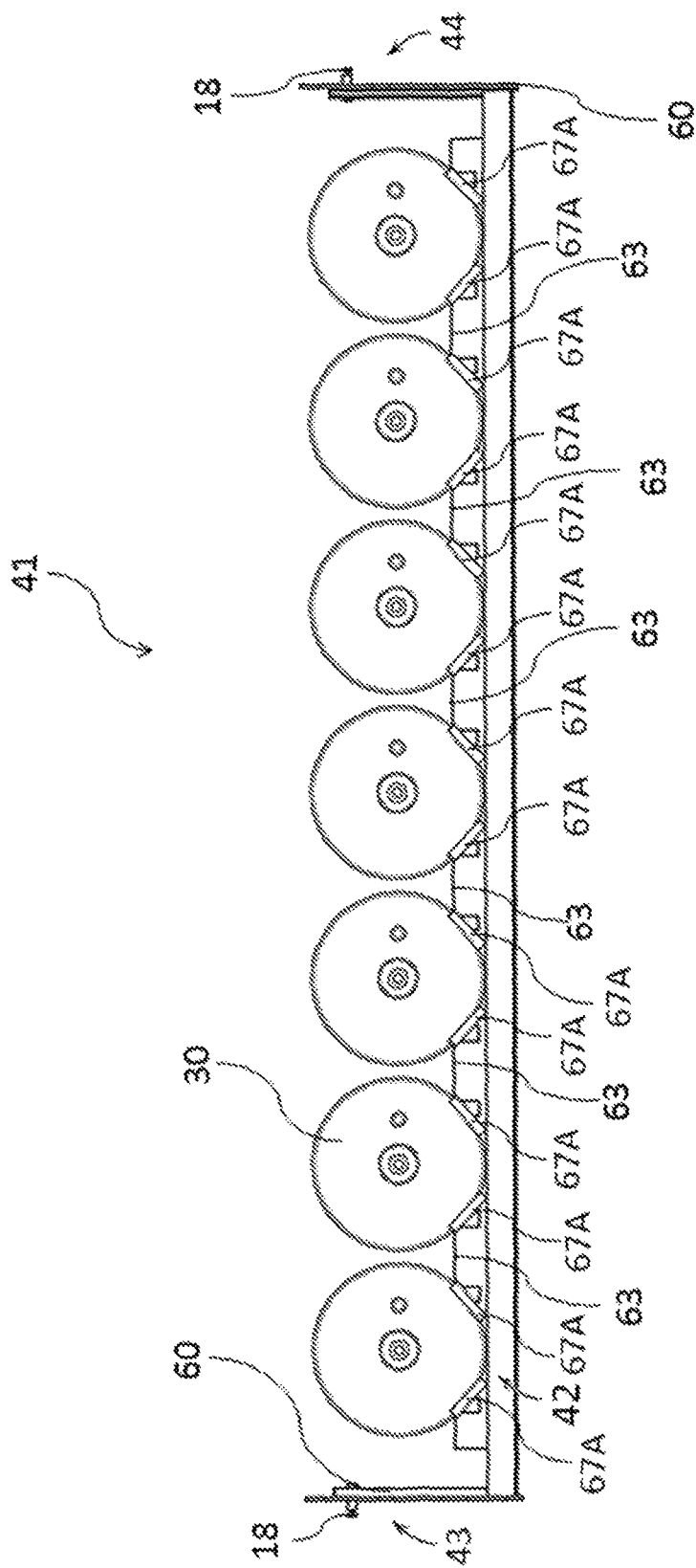
FIG. 6 shows a front elevation view of an example of a cradle of a vertical storage system according to various alternative embodiments described herein.

FIG. 5 represents a front perspective view an example of a cradle 41 in accordance with preferred embodiments. In this example the cradle 41 preferably comprises; a front carrier load bar 61 and a back carrier load bar 62 that are parallel to each other. Each carrier load bar 61/62 is preferably attached to a carrier load plate 60 at distal ends making the frame of the cradle 41. The cradle 41 is preferably designed with one or more lateral barrel restraint(s) 64 to prevent a keg barrel 30 from moving side to side.

In some embodiments, a barrel receiving valley 42 of a cradle 41 may be configured to arrest the movement of a barrel 30 placed within the barrel receiving valley 42 thereby allowing the barrel 30 to remain stationary in the barrel receiving valley 42 while the cradle 41 is vertically rotated. In further embodiments, the barrel receiving valley 42 may comprise or be formed by a back restraint member 55, a front restraint member 25, and/or two lateral barrel restraints 64 which may be positioned on the cradle 41 to contact portions of a barrel 30 received on the cradle 41. In preferred embodiments the forward restraint 11 and back adjustable restraint plate 65 are configured to prevent the keg barrel 30 from moving beyond desired distance in a forward or rear (longitudinal) direction while the lateral barrel restraints 64 are configured to prevent the keg barrel 30 from moving beyond a desired distance in a side to side (lateral) direction.

Figure 4:
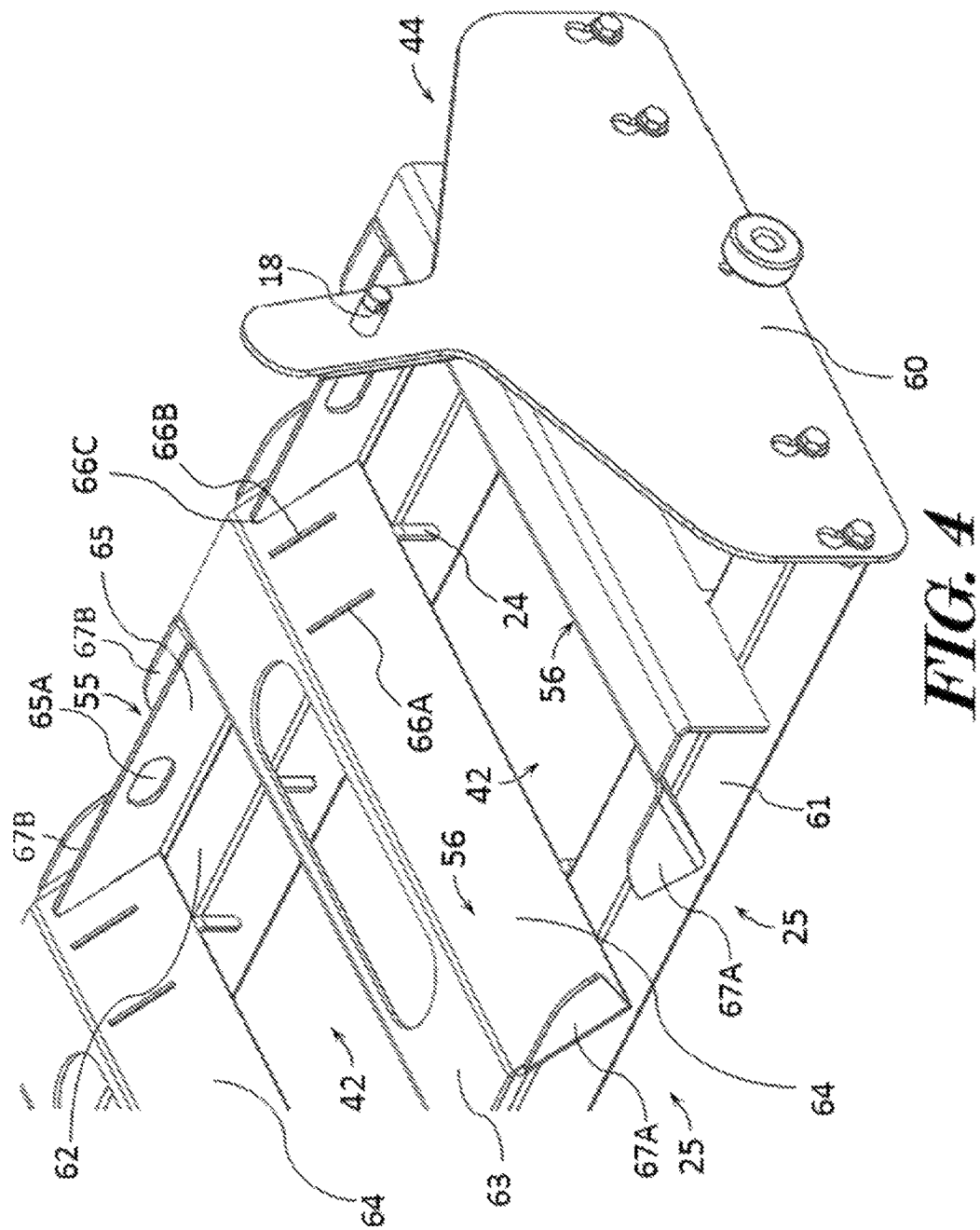
FIG. 4 depicts a front partial perspective view of an example of a cradle of a vertical storage system according to various alternative embodiments described herein.
Figure 7:
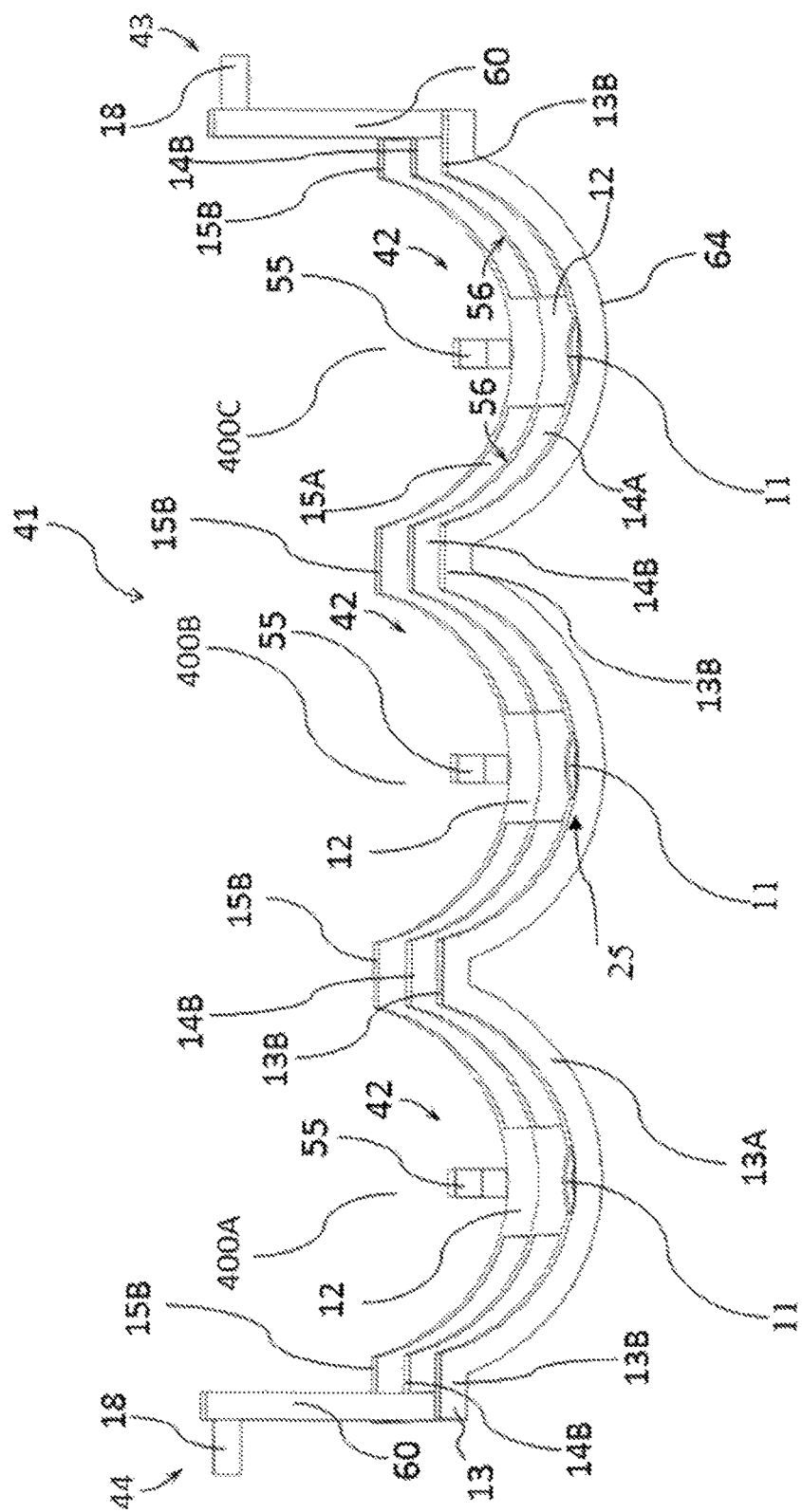
FIG. 7 depicts a front perspective view of an alternative example of a cradle of a vertical storage system according to various alternative embodiments described herein.

The cradle 41 may comprise a plurality of lateral barrel restraints 64 configured to arrest the lateral movement of a barrel 30 placed within a barrel receiving valley 42. Preferably, each barrel receiving valley 42 may comprise two or more lateral barrel restraints 64 which may each form a lateral perimeter wall 56 of a barrel receiving valley 42. The lateral perimeter walls 56 of a barrel receiving valley 42 may contact the rounded wall 33 of a barrel 30 to prevent the barrel 30 from rolling laterally off of the cradle 41. In some embodiments and as best shown by the example of FIG. 4, a barrel receiving valley 42 may comprise two lateral barrel restraints 64 which may form two lateral perimeter walls 56. In other embodiments and as best shown by the example of FIG. 7, a barrel receiving valley 42 may be contoured thereby forming three (left, bottom, right) lateral barrel restraints 64 which may form the three lateral perimeter walls 56. Also shown by FIG. 4, one or more support tabs 24 may be coupled or integrally formed with the underside of each lateral barrel restraint 64 and may contact with a support such as a front carrier load bar 61 or back carrier load bar 62. The support tabs 24 therefore are capable of providing structural support to the lateral barrel restraints 64 when a heavy barrel 30 is placed within a barrel receiving valley 42.

Figure 13:
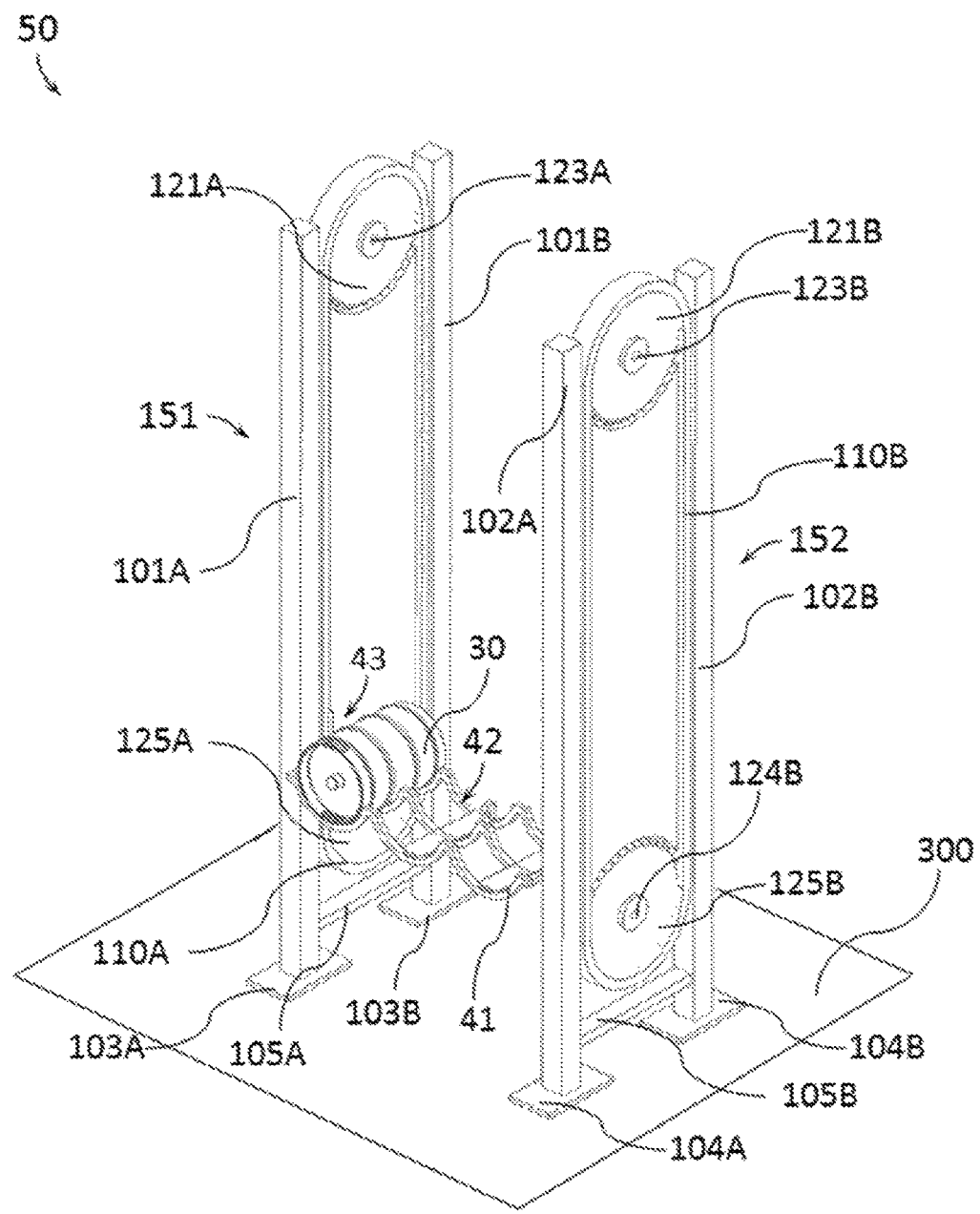
FIG. 13 depicts a front perspective view of an example of a cradle within a vertical storage system according to various embodiments described herein.
Figure 14:
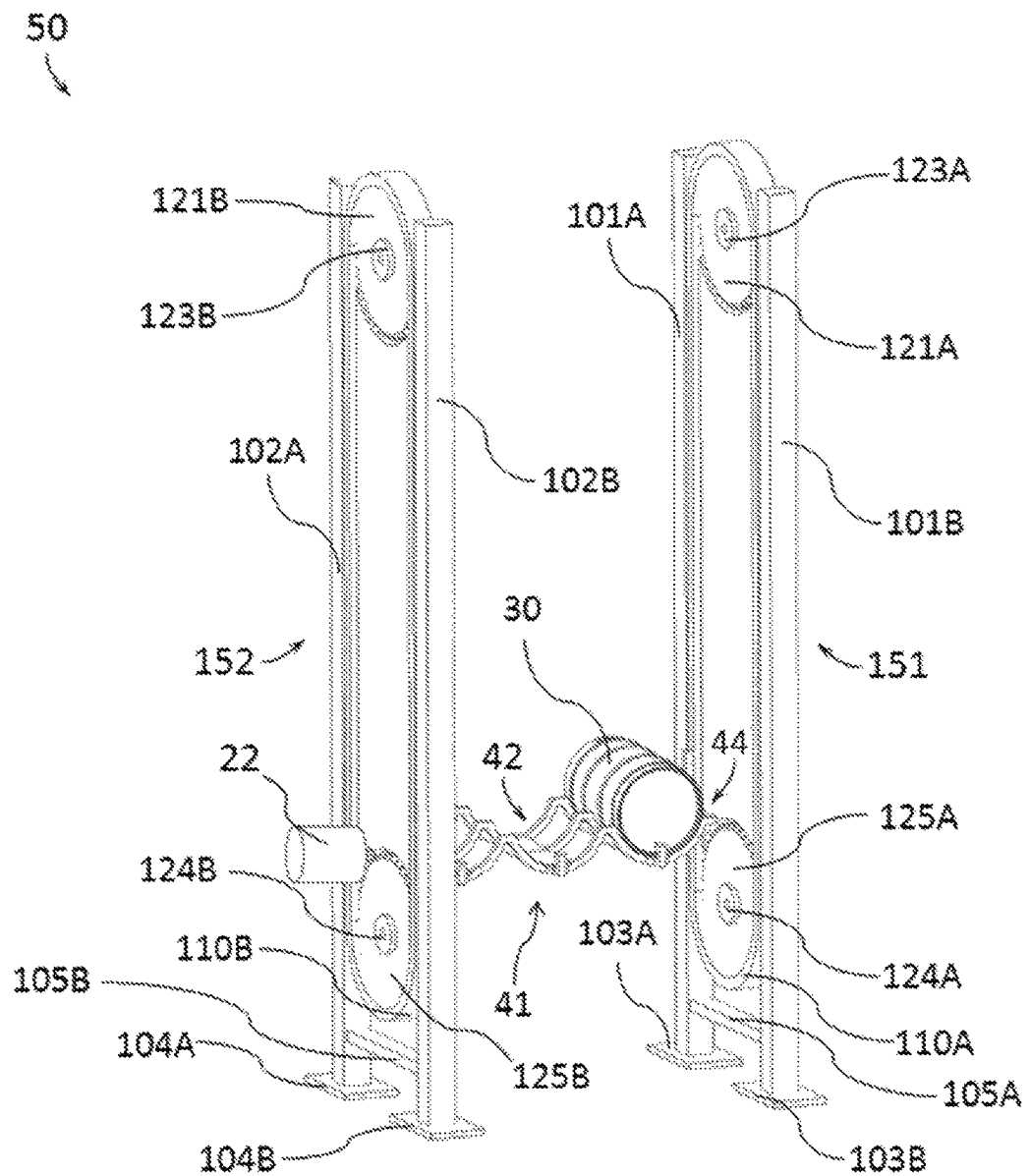
FIG. 14 illustrates a back perspective view of an example of a cradle of a vertical storage system according to various embodiments described herein.
Figure 15:
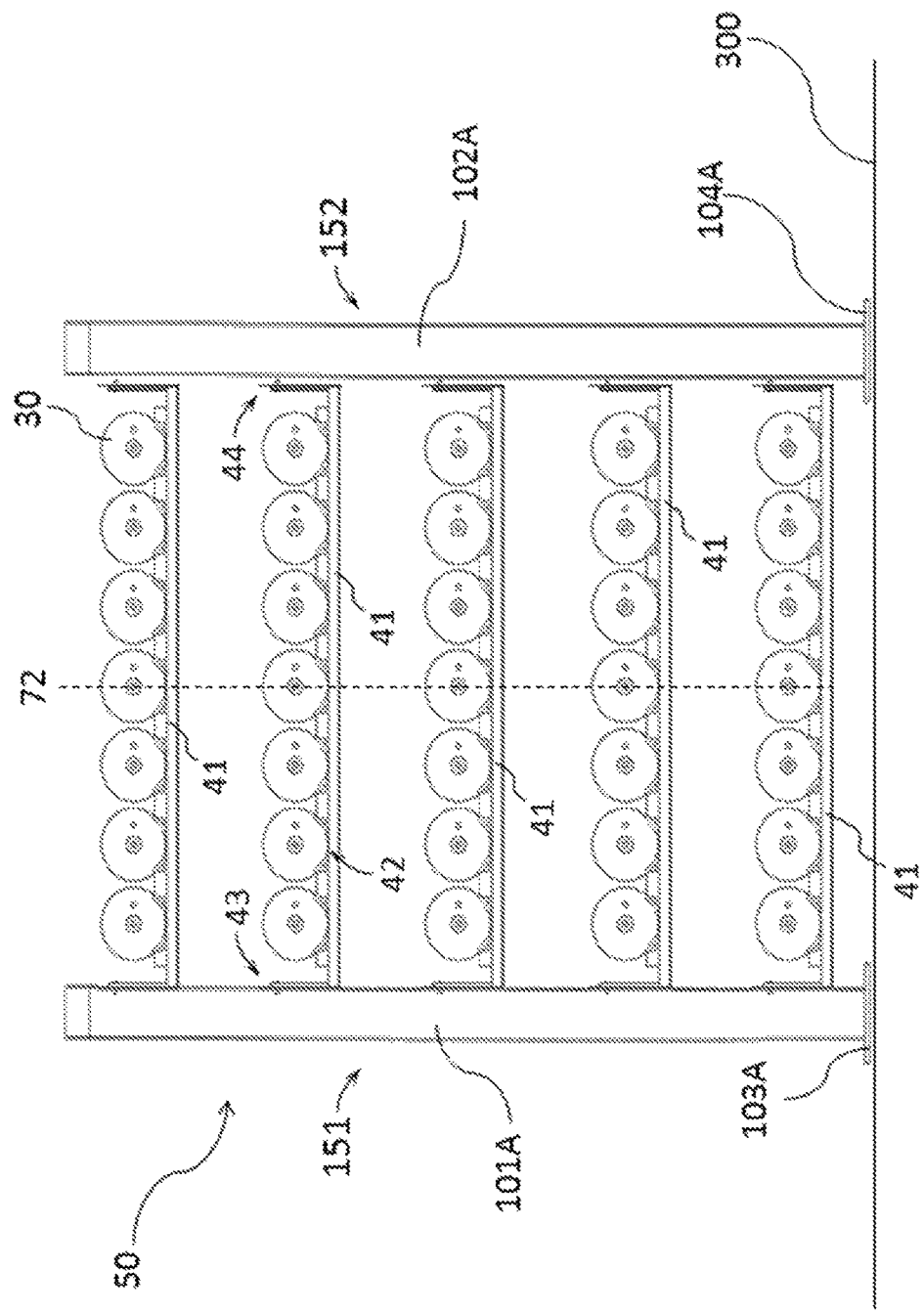
FIG. 15 shows a front elevation view of an example of a cradle of a vertical storage system according to various embodiments described herein.
Figure 16:
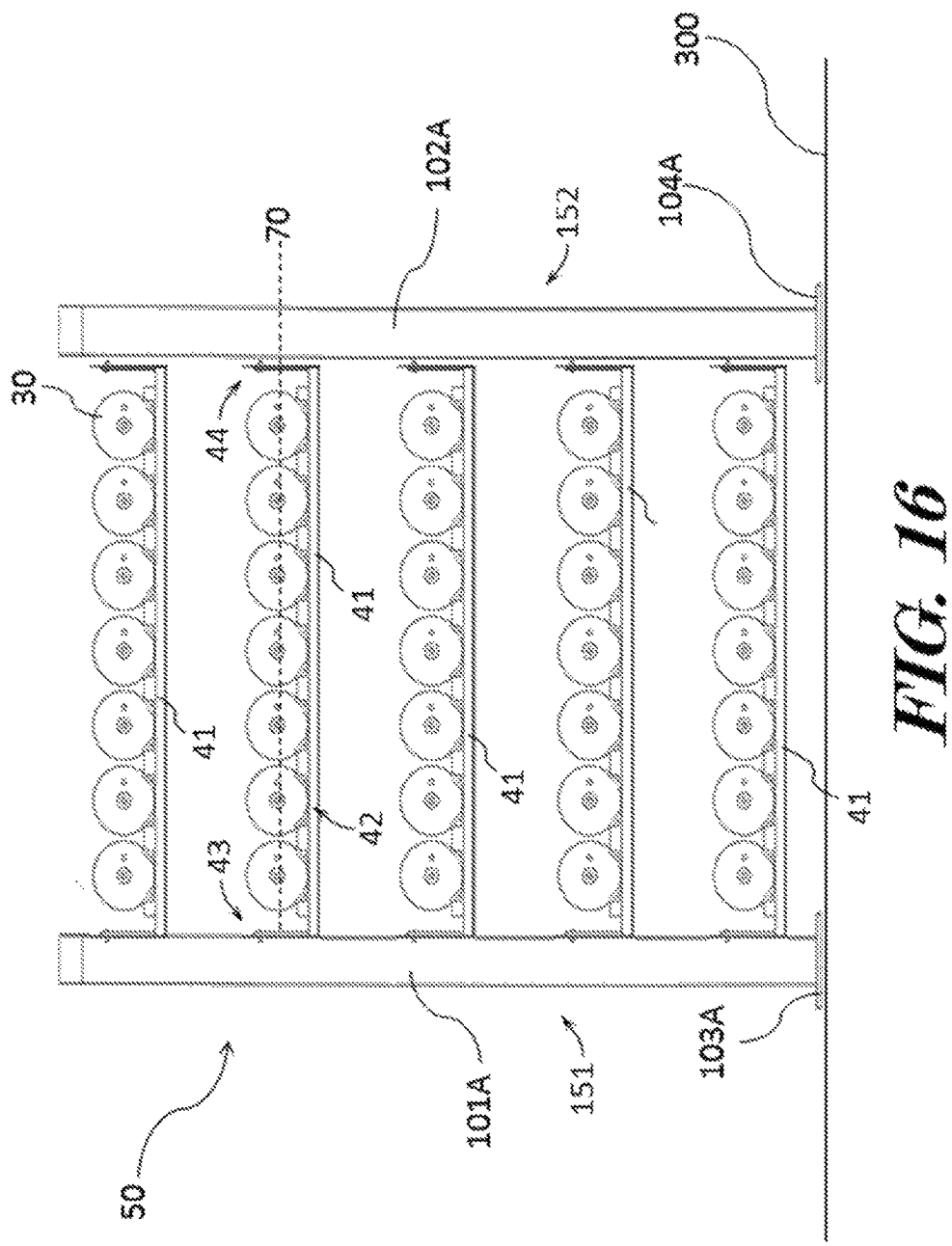
FIG. 16 depicts a front view of an example of a cradle of a vertical storage system according to various embodiments described herein.
Figure 17:
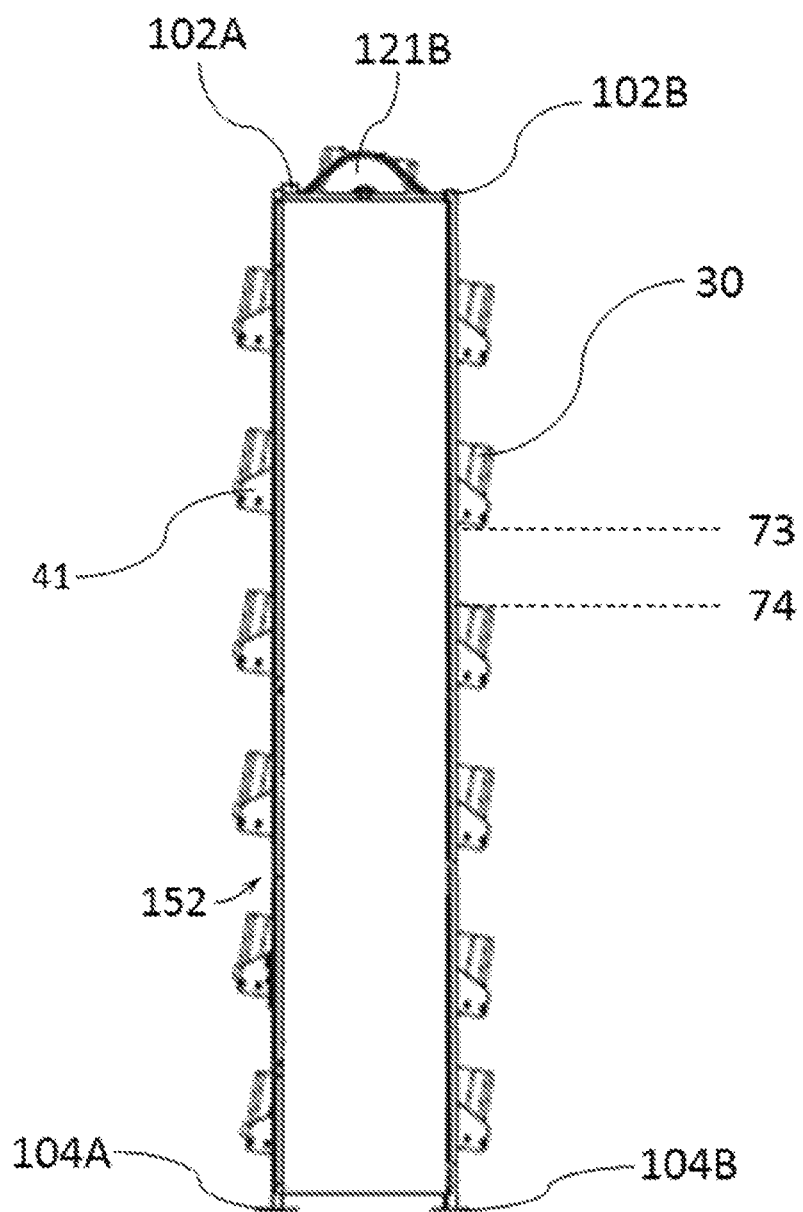
FIG. 17 illustrates a side elevation view of an example of a cradle of a vertical storage system according to various embodiments described herein.

The lateral barrel restraints 64 may be configured to contact a barrel 30 at non-right angles to accept the rounded wall 33 of the barrel 30. For example, in some embodiments and as shown by FIGS. 3, 4, and 5, the lateral barrel restraints 64 may be configured with angled or contoured sidewalls suitable for making contact with the rounded wall 33 a keg barrel 30 and preventing the lateral or side to side movement of the keg barrel 30 while being transported in the cradle 41. In further embodiments, and as shown by FIGS. 7, 13, and 14, the lateral barrel restraints 64 may be configured with rounded or curved sidewalls suitable for making contact with the rounded wall 33 a keg barrel 30 and preventing the lateral or side to side movement of the keg barrel 30 while being transported in the cradle apparatus 41.

A back restraint member 55 may be configured to arrest the rearward movement of a barrel 30 when placed within a barrel receiving valley 42. The back restraint member 55 may be coupled to a lateral barrel restraint 64 proximate to the back carrier load bar 62 and/or coupled to the back carrier load bar 62. When a barrel 30 is received in the barrel receiving valley 42 a rim 31, such as the lower rim, of the barrel may contact or rest against the back restraint member 55 to arrest the rearward movement of the barrel 30. In some embodiments, a lateral barrel restraint 64, or the cradle 41 itself may comprise one or more slots 66A, 66B, 66C which may receive portions of a back restraint member 55 thereby allowing the back restraint member 55 to be coupled to different positions on the lateral barrel restraint 64 or cradle 41. In preferred embodiments, a back restraint member 55 may comprise a back restraint plate 65 which may be used to accommodate and arrest the rearward movement of various sized kegs 30. A back restraint plate 65 may be adjustably positioned by being received in different slots 66, such as in a front receiver slot 66A, middle receiver slot 66B, and back receiver slot 66C, thereby allowing the back restraint plate 65 to be adjustable to a plurality of positions within a barrel receiving valley 42. It is understood that this back restraint member 55 can be adjustably fixed to the cradle 41 in alternative designs. In other embodiments, a back restraint member 55 may comprise a back restraint plate 67B (FIGS. 3 and 4) which may be permanently coupled to a lateral barrel restraint 64 proximate to the back carrier load bar 62 and/or coupled to the back carrier load bar 62. One or more back restraint plates 67B may extend away from a lateral perimeter wall 56 of a barrel receiving valley 42 to contact a rim 31, such as the lower rim, of a barrel 30 within a barrel receiving valley 42 to arrest the rearward movement of the barrel 30.

A front restraint member 25 may be configured to arrest the forward movement of a barrel 30 when placed within a barrel receiving valley 42. The front restraint member 25 may be coupled to a lateral barrel restraint 64 proximate to the front carrier load bar 61 and/or coupled to the front carrier load bar 61 or other locations within the cradle 41. When a barrel 30 is received in the barrel receiving valley 42, a rim 31, such as the upper rim, of the barrel 30 may contact or rest against the front restraint member 25 to arrest the forward movement of the barrel 30.

One or ordinary skill in the art should recognize that a front restraint member 25 may be configured in a plurality of shapes and sizes. In some embodiments and as shown in FIGS. 3, 4, 6, and 8-10, a front restraint member 25 may comprise a front restraint plate 67A. In further embodiments, a front restraint plate 67A may be coupled to one or more, such as two, lateral barrel restraints 64 of a barrel receiving valley 42 and may extend away from a lateral perimeter wall 56 of a barrel receiving valley 42 to contact a rim 31, such as the upper rim, of a barrel 30 within a barrel receiving valley 42 to arrest the forward movement of the barrel 30.

Figure 8:
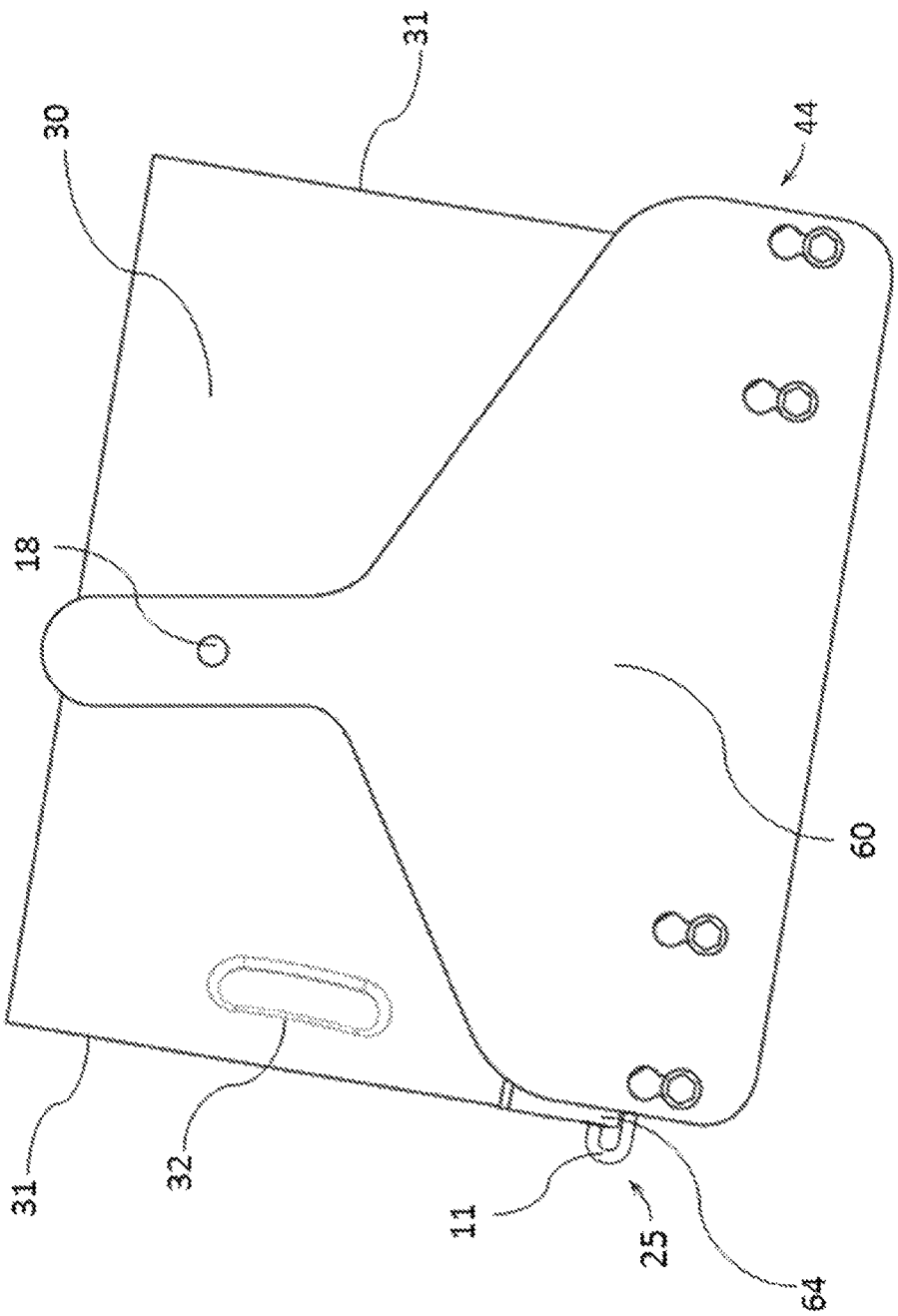
FIG. 8 illustrates a side elevation view of an example of a cradle of a vertical storage system according to various preferred embodiments described herein.
Figure 9:
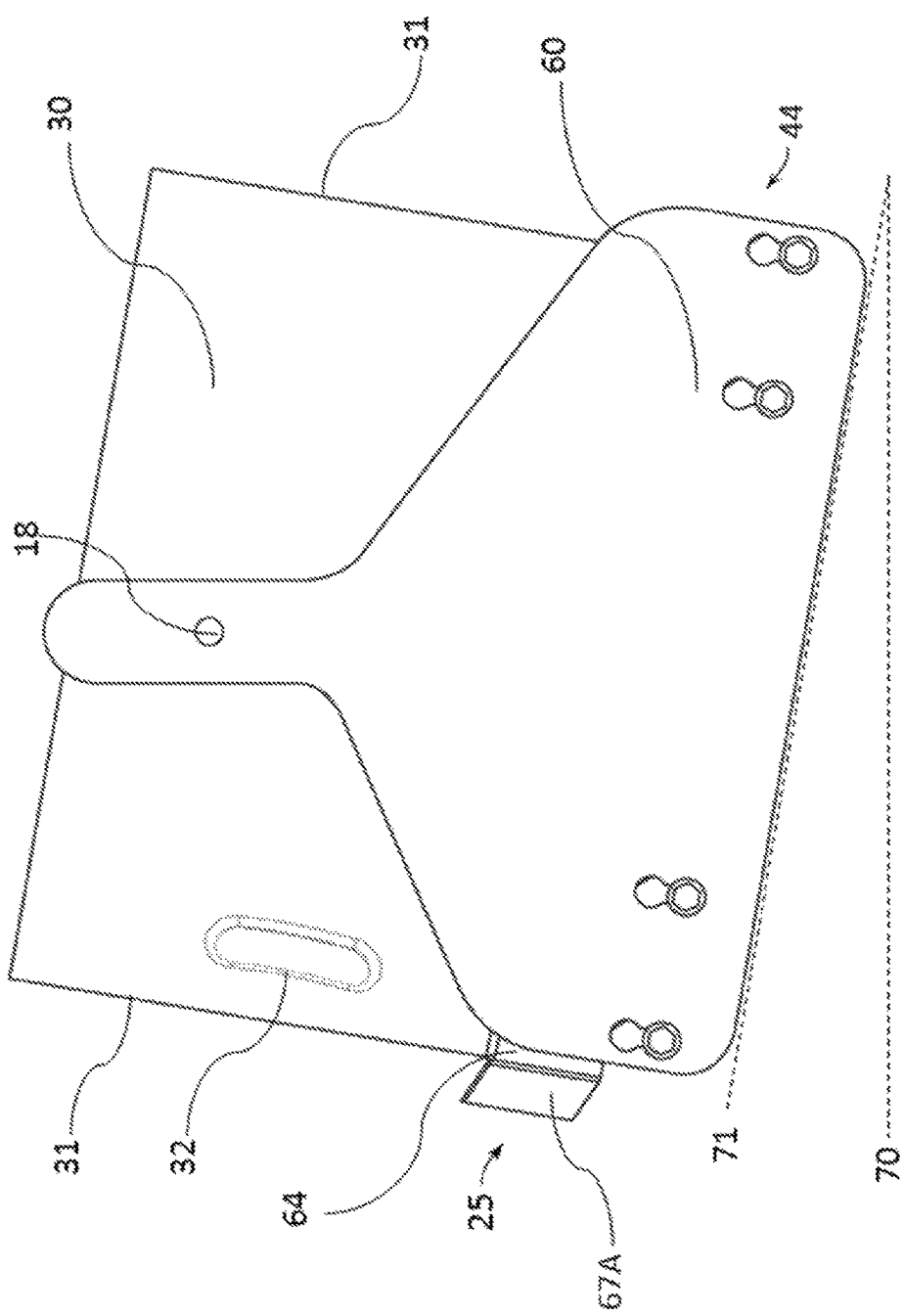
FIG. 9 shows a side elevation view of an example of a cradle of a vertical storage system according to various alternative embodiments described herein.
Figure 10:
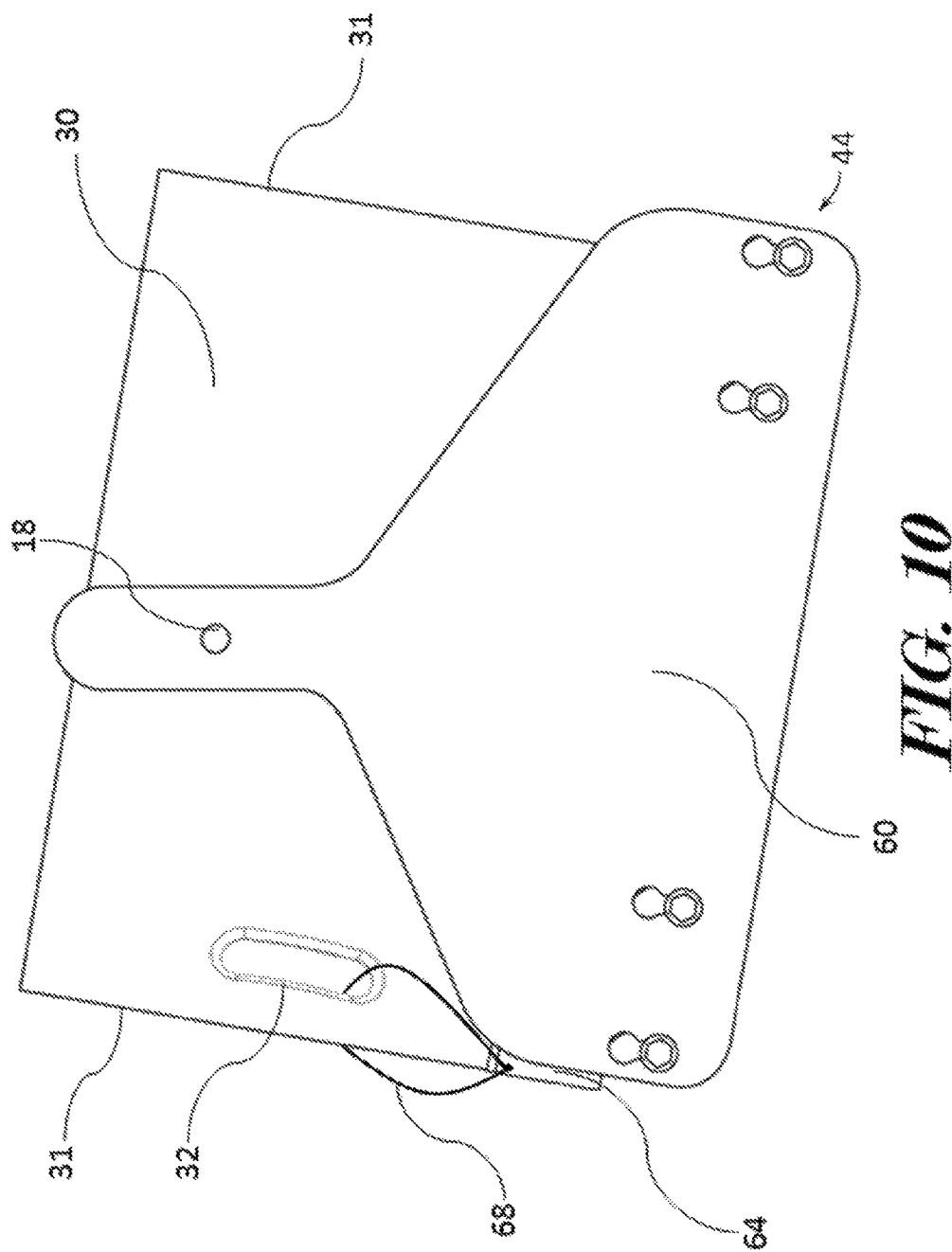
FIG. 10 depicts a side elevation view of an example of a cradle of a vertical storage system according to various alternative embodiments described herein.
Figure 11:
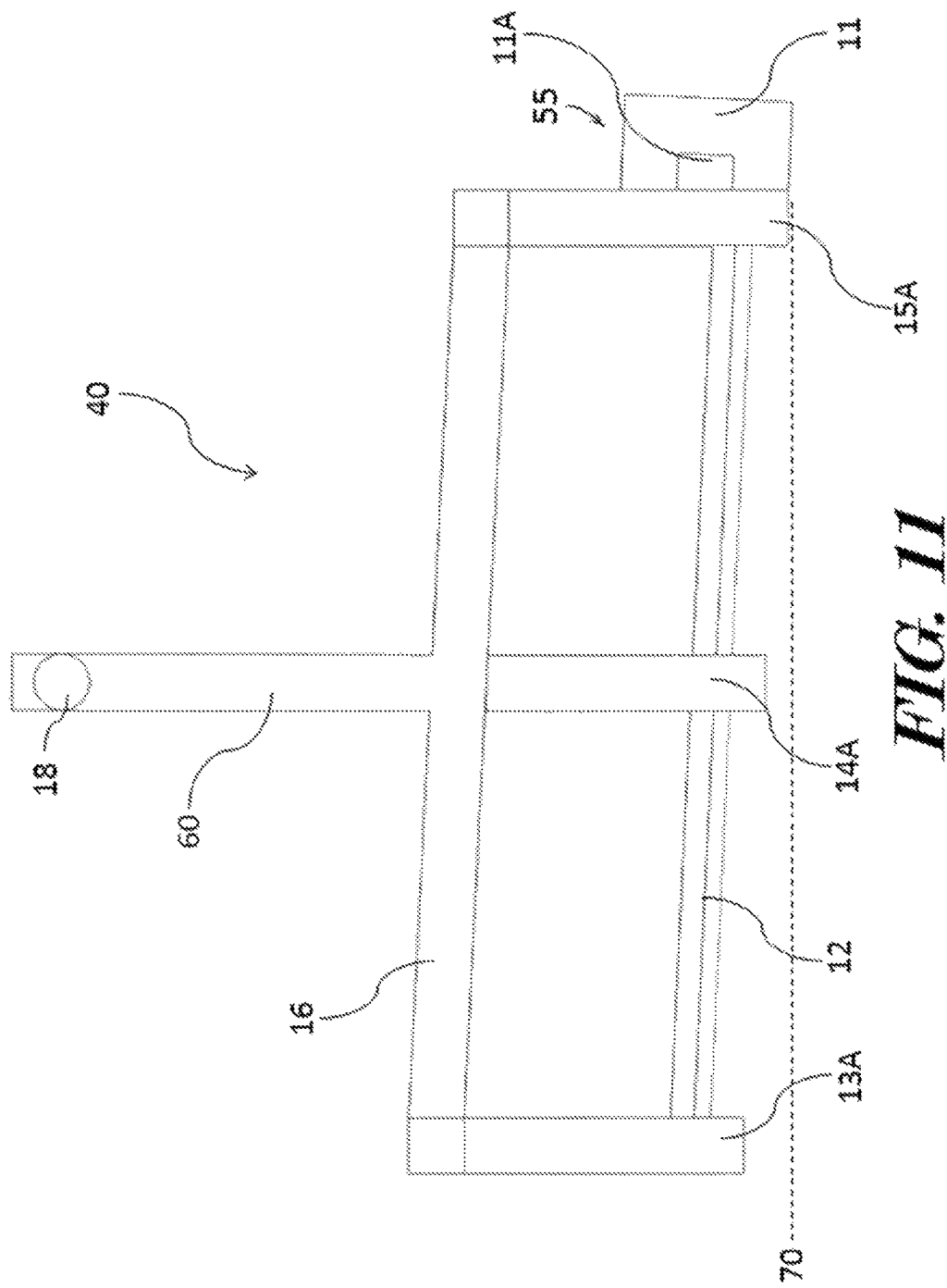
FIG. 11 illustrates a side elevation view of an example of a cradle of a vertical storage system according to various alternative embodiments described herein.
Figure 12:
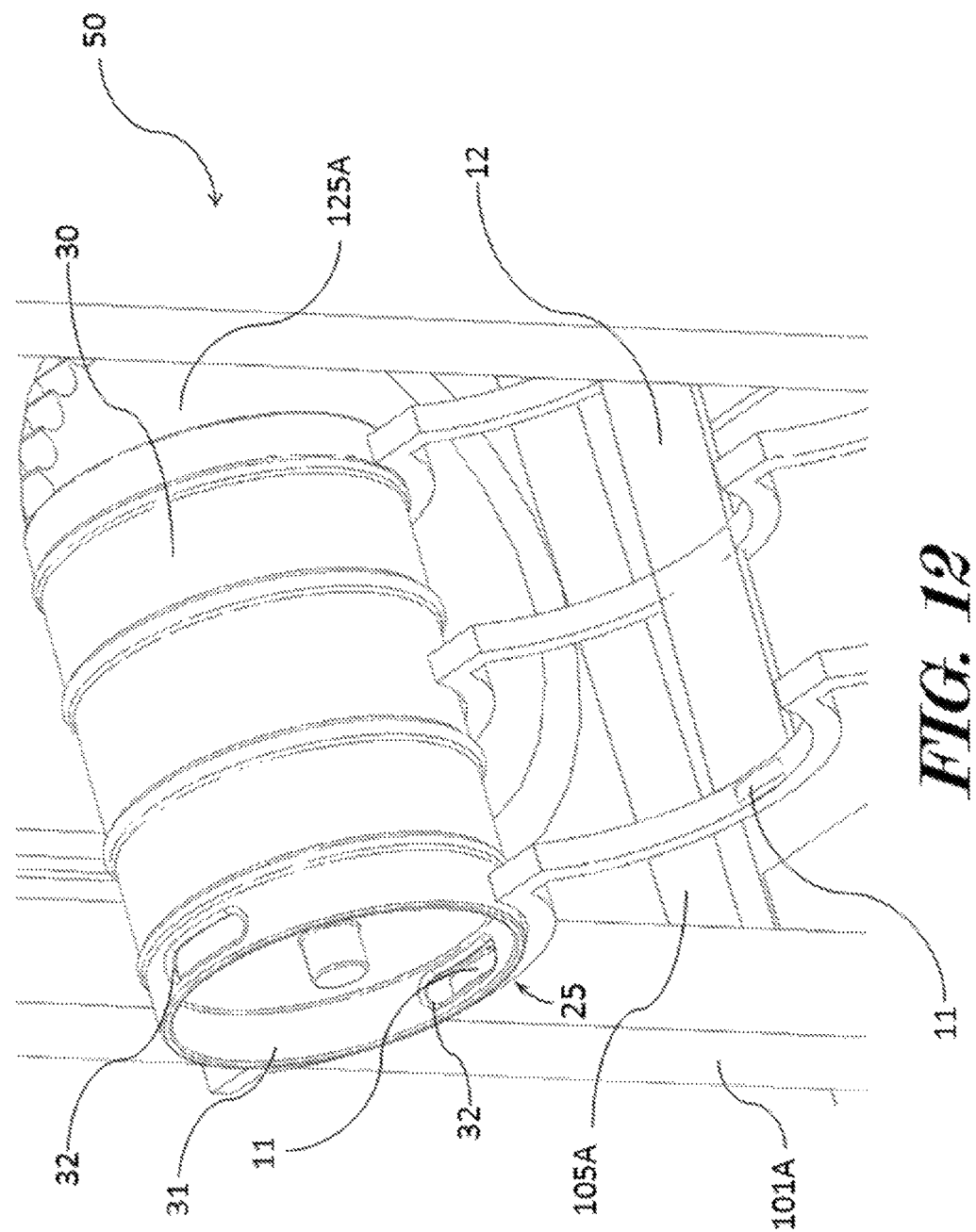
FIG. 12 shows a front perspective view of an example of a portion of a cradle of a vertical storage system according to various alternative embodiments described herein.

In some embodiments, a front restraint member 25 may comprise a lip 11 configured to engage or contact the rim 31 of a barrel 30 by extending into or towards the barrel receiving valley 42. In further embodiments and as shown in FIGS. 5, 7, and 12, a lip 11 may engage with the upper rim 31 of a barrel 30 by contacting a portion of the rim 31, such as the upper rim, of a barrel 30 within a barrel receiving valley 42 to arrest the forward movement of the barrel 30. In still further embodiments and as shown by FIG. 12, a lip 11 may engage with the upper rim 31 of a barrel 30 by contacting or protruding through a handle 32 of a barrel 30 within a barrel receiving valley 42 to arrest the forward movement of the barrel 30. In still further embodiments and as shown by FIG. 8, a lip 11 may be configured generally as a protrusion or hook and may engage with the upper rim 31 of a barrel 30 by contacting a portion of the rim 31, such as the upper rim, of a barrel 30 within a barrel receiving valley 42 to arrest the forward movement of the barrel 30. In even further embodiments, a lip 11 may comprise a lip depression which may further receive the rim 31 of a barrel 30 within a barrel receiving valley 42 to arrest the forward movement of the barrel 30. In this example, the front restraint member 25 is shown as a lip 11 (sometimes called barrel hook restraint in some embodiments which may be shaped as an inverted L) and is designed with a curve to cup or mate with the bottom keg rim 31 and break the plain of the keg rim 31 as shown in FIGS. 3, 5, and 11. In FIGS. 5, 8 and 14 a front restraint member 25 is shown by example as a lip 11 which is utilized to restrict forward movement of the keg barrel 30. In FIG. 9, the front restraint member 25 is shown as an angle restraint plate 67 to engage the keg rim 31 to hold a keg barrel 30 in position. FIG. 12 shows a lip 11 engaged with the keg handle 32 to hold a keg barrel 30 in position. FIG. 10 shows a different embodiment of a front restraint member such as a flexible restraint line 68 utilizing the keg handle 32 and coupled to a lateral barrel restraint to restrain or hold a keg barrel 30 in position. It is to be understood that the flexible restraint line 68 could be made of cable, chain, rope or other suitable material. In addition, the position or placement of these restraint device(s) are for illustration purposes and are not limiting.

Referring now to FIG. 7, an example of an alternative cradle 41 is shown and described in detail. The cradle 41 preferably comprises; a front cradle bar 13 having a front curved barrel cradle bar 13A section and a front straight barrel cradle bar 13B section, a back cradle bar 15 having a back curved barrel cradle bar 15A section and a back straight barrel cradle bar 15B section, and optionally a center cradle bar 14 having a center curved barrel cradle bar 14A section and a center straight barrel cradle bar 14B section. In this embodiment, first barrel position 400A, second barrel position 400B, and third barrel position 400C are designed with a centrally placed cradle barrel glide 12 or skid plate which allows the barrel 30 to be easily slid into position over the front curved barrel cradle bar 13A, center curved barrel cradle bar 14A, and the back curved barrel cradle bar 15A, thus, each barrel position 400A/400B/400C serves as a barrel receiving valley 42. The barrel glide 12 is preferably configured with a smooth or planar top surface made from metal or other suitable material. In preferred embodiments, each barrel position 400A, 400B, 400C, is engineered with a front restraint member 25 such as a lip 11 protruding above and away from either the front curved barrel cradle bar 13A or cradle barrel glide 12 to restrict forward movement of the barrel 30 as shown in FIG. 9. As also shown in FIGS. 3, 4, 5, and 8 each barrel position may further comprise one or more back restraint members 55 positioned opposite to a front restraint member 25 with said back restraint members 55 configured to restrict rearward movement of the barrel 30 placed between the 41 lateral barrel restraints 64. In this example, the front restraint member 25 is designed lip 11 and the back restraint member 55 is shown as an inverted L shaped restraint.

FIG. 9 shows a side elevation view of a cradle 41 containing a keg barrel 30 in accordance with some embodiments of the present invention. As shown by this example, the cradle 41 is preferably mounted or configured to at an angled plain 71 relative to a horizontal plain 70 thereby tilting the barrel 30 so that the top end of the barrel 30 is raised above the lower end. In preferred embodiments, the angled plain 71 is between 5-45 degrees relative to the horizontal plain 70 (the horizontal plain 70 is generally parallel to the ground). In yet further embodiments, the angled plain 71 is preferably between 8-30 degrees relative to the horizontal plain 70.

Now turning to FIG. 11 in this embodiment, the cradle 41 comprises a front barrel cradle bar 13A slightly higher than center cradle bar 14A and the back cradle bar 15A. The center cradle bar 14A is slightly higher than the back cradle bar 15A and slightly lower that the front cradle bar 13A. The back cradle bar 15A is slightly lower that the front cradle bar 13A and the center cradle bar 14A. This design utilizes gravity to position the keg barrel 30 back or bottom rim 31 against the back restraint member 55. In this embodiment, back restraint member 55 may comprise a back depression 55A which may further receive the bottom rim 31 of a barrel 30 within a barrel receiving valley 42 to arrest the rearward movement of the barrel 30. In alternative embodiment the front cradle bar 13A, center cradle bar 14A and back cradle bar 15A may be on the same horizontal plane. In other embodiments the cradle 41 design may be of any suitable size and shape including cylindrical shaped, oval shaped, pyramidal shaped, cube shaped, triangle etc. In further alternative embodiments, a cradle 41 may comprise a back cradle bar 15A slightly higher than the center cradle bar 14A and the front barrel cradle bar 13A. The center cradle bar 14A may be slightly higher than the front cradle bar 13A and slightly lower that the back cradle bar 15A. This design utilizes gravity to position the keg barrel 30 top or upper rim 31 against a front restraint member 25.

In FIG. 13, the vertical storage system 50 may comprise a rigid framing structure formed by a first vertical support tower 151 and a second vertical support tower 152 and comprising a front left vertical frame member 101A and a second back left vertical frame member 101B spaced apart from said front left vertical frame member 101A are coupled to left front support leg 103A and left back support leg 103B at their lower ends with left front support legs 103A and left back support leg 103B configured to make contact with the ground 300 such as the floor of a warehouse. As shown by a preferred embodiment in FIG. 13, one or more left transverse beams 105A may connect the front left vertical frame member 101A and back left vertical frame member 101B to provide rigidity and support to the cradle 41. A left carrier chain 110A (such as a chain with links or drive belt) is preferably engaged with the left top sprocket wheel (first upper sprocket wheel 121A) at one end and a bottom left sprocket wheel (first lower sprocket wheel 125A) at opposite ends. The first upper and lower sprocket wheels 121A, 125A preferably contain sprockets or teeth to engage with the first carrier chain 110A and facilitate the rotational movement of the first carrier chain 110A and therefore the vertical rotation of the cradles 41 about the vertical storage system 50. Also, in this example, a second rigid framing structure comprising a second front right vertical frame member 102A and a back right vertical frame member 102B spaced apart from said front right vertical frame member 102A are coupled to right front support leg 104A and right back support leg 104B at their lower ends with right front support leg 104A and right back support leg 104B configured to make contact with the ground 300 such as the floor of a warehouse. One or more right transverse beams 105B may connect the front right vertical frame member 102A and back right vertical frame member 102B to provide rigidity and support to the cradle 41. A second carrier chain 110B (such as a chain with links or drive belt) is preferably engaged with a second upper sprocket wheel 121B at one end and a second lower sprocket wheel 125B at an opposite end. The sprocket wheels 121B, 125B preferably contain sprockets or teeth to engage with the second carrier chain 110B and facilitate the rotational movement of the second carrier chain 110B about the vertical storage system 50.

Still referring to FIG. 13, in this example, a vertical storage system 50 is shown with one keg barrel 30 being carried in the first barrel position 400A (FIG. 7) of a barrel receiving valley 42 by a rotating barrel cradle 41. In preferred embodiments, the vertical storage system 50 is configured to removably secure a plurality of keg barrel(s) 30 in a vertical orientation and rotate the plurality of keg barrels 30 vertically allowing a user who may be posited at or near the ground 300 to access any keg barrel 30 secured by the rotating barrel cradle apparatus 41 within the vertical storage system 50.

In the embodiment shown by FIG. 13 and FIG. 14, the left top mounting shaft 123A and the right top mounting shaft 123B are positioned along the same axis. Conversely, the bottom left mounting shaft 124A and the bottom right mounting shaft 124B are positioned along the same axis. A motor 22 such as an electric or gas powered motor may mounted to the transverse beam 105A, 105B, or vertical frame members 101A, 101B, 102A, 102B or at other suitable locations. The motor 22 is configured to drive the rotational movement of a sprocket wheels 121A, 125A, 121B, 125B, or multiple sprocket wheels thereby causing the left (first) or right (second) carrier chains 110A, 110B, and the cradles 41 coupled to the chains 110A, 110B, to rotate vertically about the vertical storage system 50. One of ordinary skill in the mechanical arts can readily understand how a motor 22 may be operably engaged to drive a sprocket wheel, however, one non-limiting example is provided by FIGS. 13 and 14.

As perhaps best shown in FIGS. 13-16, a rotating vertical storage system 50 for barrels 30 may comprising a first vertical support tower 151 having a first upper sprocket wheel 121A and a first lower sprocket wheel 125A with a first carrier chain 110A rotationally coupled to a first upper sprocket wheel 121A and first lower sprocket wheel 125A. A second vertical support tower 152 having a second upper sprocket wheel 121B and a second lower sprocket wheel 125B with a second carrier chain 110B may be rotationally coupled to the upper 121B and lower 125B second sprocket wheels. The system 50 may also include a first cradle 41 with a first end 43 coupled to the first carrier chain 110A and with a second end 44 coupled to the second carrier chain 110B. The cradle 41 may comprise a plurality of barrel receiving valleys 42 adapted to removably secure a plurality of barrels 30. A motor 22 may be operably connected to the first carrier chain 110A and configured to rotate the first carrier chain 110A and first cradle 41 in a vertical direction. In some embodiments, a second motor 22 may be operably connected to the second carrier chain 110B thereby driving the second carrier chain 110B around the second upper sprocket wheel 121B and second lower sprocket wheel 125B. A motor 22 may be operably connected to a carrier chain 110A, 110B, in a plurality of ways to transfer rotational motion from the motor 22 to a carrier chain 110A, 110B. For example, a motor 22 may be rotationally coupled to a lower sprocket wheel 125A, 125B, so that rotation of the motor 22 is transferred to the lower sprocket wheel 125A, 125B, and then to a carrier chain 110A, 110B, thereby operably connecting the motor 22 to the carrier chain 110A, 110B. In another example, a motor 22 may be rotationally coupled to an upper sprocket wheel 121A, 121B, so that rotation of the motor 22 is transferred to the upper sprocket wheel 121A, 121B, and then to a carrier chain 110A, 110B, thereby operably connecting the motor 22 to the carrier chain 110A, 110B. In another example, a motor 22 may be rotationally coupled directly to a carrier chain 110A, 110B, so that rotation of the motor 22 is transferred directly to the carrier chain 110A, 110B, thereby operably connecting the motor 22 to the carrier chain 110A, 110B. In further embodiments, the system 50 may comprise a plurality of barrels 30 removably secured within the plurality of barrel receiving valleys 42, with the plurality of barrels 30 vertically oriented relative to each other (FIG. 15 and FIG. 16) and the system 50 may be configured to vertically rotate each of the cradles 41 in a vertical direction allowing the cradles 41 to be moved generally closer to or farther from a floor surface 300 supporting the system 50. A plurality of barrels 30 within the plurality of barrel receiving valleys 42 of a cradle 41 may be horizontally oriented relative to the other barrels 30 within the same cradle 41 and vertically oriented relative to the other barrels within a different cradle 41 as the cradles 41 are moved in a vertical direction.

Also as perhaps best shown in FIGS. 13-16, a method for vertically storing a plurality of barrels 30 is provided. In some embodiments, the method may comprise: providing a first vertical support tower 151 secured to a ground surface 300 and having a first upper sprocket wheel 121A and a first lower sprocket wheel 125A with a first carrier chain 110A rotationally coupled to said upper 121A and lower 125A first sprocket wheels; providing a second vertical support tower 152 secured to the ground surface 300 and having a second upper sprocket wheel 121B and a second lower sprocket wheel 125B with a second carrier chain 110B rotationally coupled to said upper 121B and lower 125B second sprocket wheels; providing a first cradle 41 with a first end 43 coupled to said first carrier chain 110A and with a second end 44 coupled to said second carrier chain 110B, said first cradle 41 comprising a plurality of barrel receiving valleys 42 adapted to removably secure a plurality of barrels 30; providing a motor 22 operably connected to the first carrier chain 110A of said first vertical support tower 151; placing a first barrel 30 into a first barrel receiving valley 42 of the first cradle 41 wherein said first cradle 41 is at a first height above the ground surface 300; and causing the motor 22 to rotate the first carrier chain 110A of said first vertical support tower 151 and said first cradle 41 so that said first cradle 41 is moved to a second height above the ground surface 300.

Figure 18:
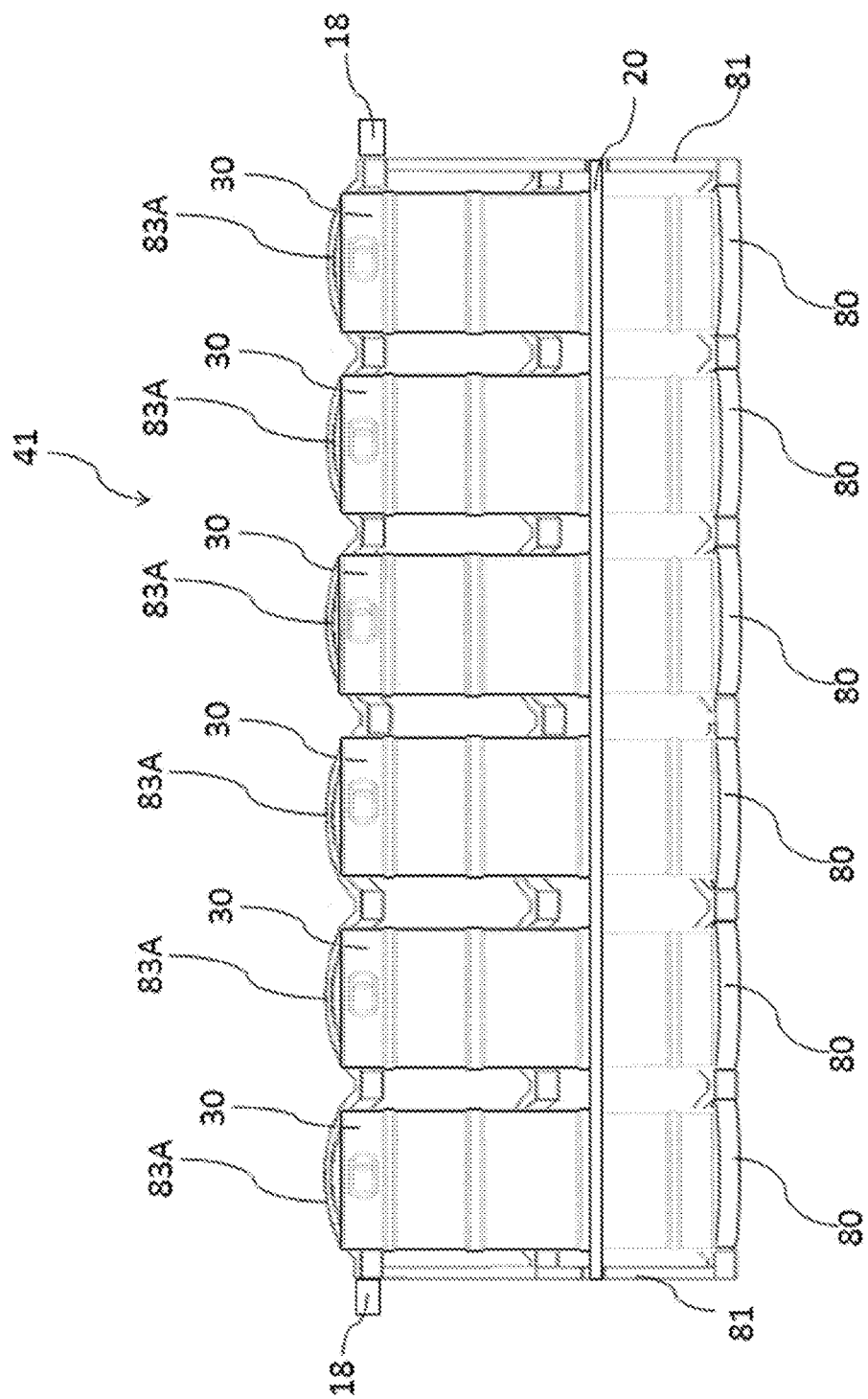
FIG. 18 shows a front elevation view of a cradle of a vertical storage system according to various alternative embodiments described herein.
Figure 19:
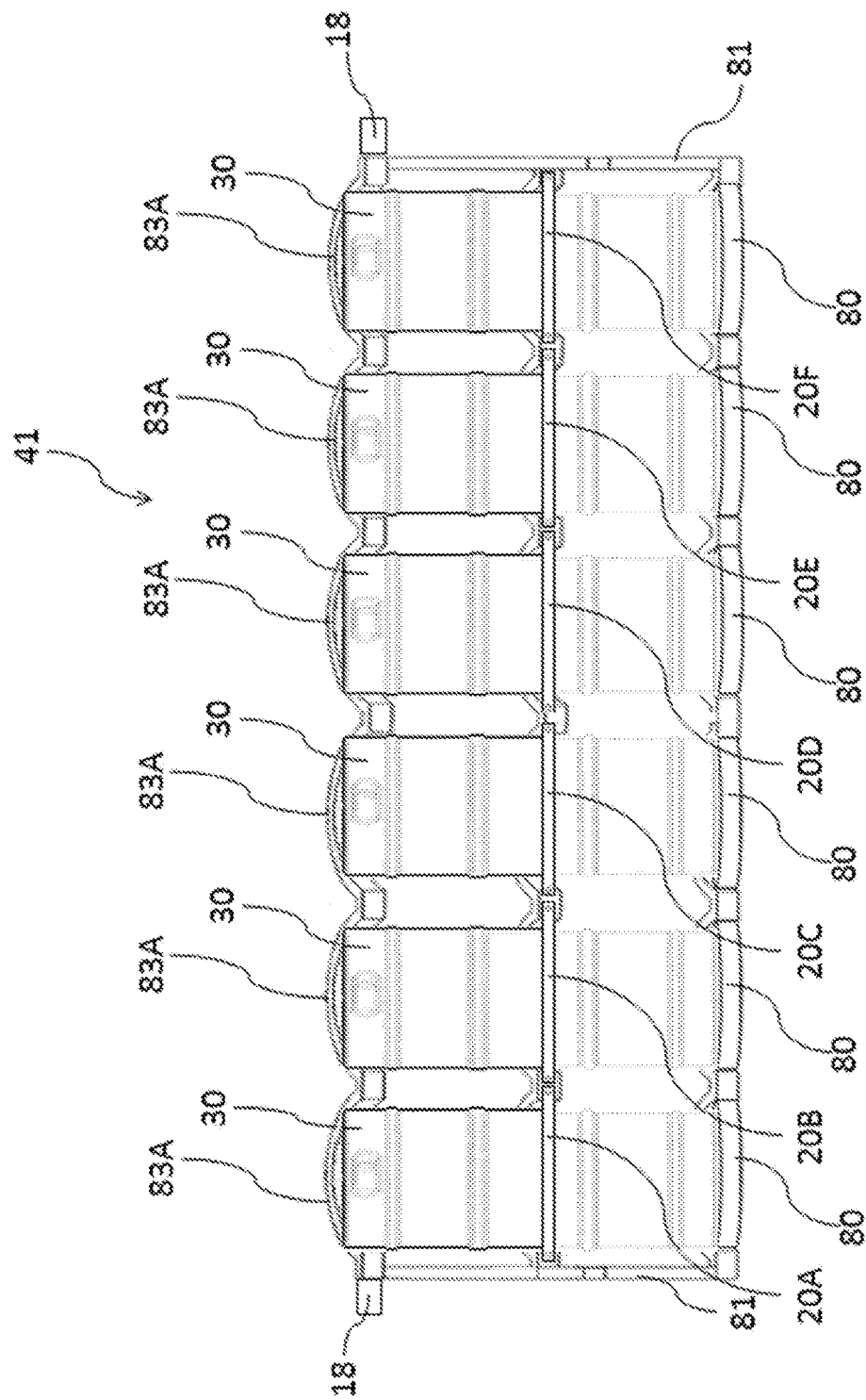
FIG. 19 depicts a front elevation view of a cradle of a vertical storage system according to various alternative embodiments described herein.

Now turning to FIGS. 18-22, an example of an alternative embodiment of a rotating barrel cradle apparatus 41 is shown and described in detail. The rotating barrel cradle 41 comprises; a top curved barrel containment bar 83A section, a center curved barrel containment bar 83B section and a bottom curved barrel containment bar 83C section. In this embodiment, first barrel position 400A, second barrel position 400B, and third barrel position 400C, forth barrel position 400D, fifth barrel position 400E, sixth barrel position 400F, each form a barrel receiving valley 42 and are each designed with a barrel carrier platform 80 which allow the barrel 30 to be easily transported vertically. The barrel carrier platform 80 is preferably configured with rollers or a smooth or planar top surface made from metal or other suitable material. In preferred embodiments, each barrel opening 400A & 400B, 400C & 400D, 400E & 400F is engineered with a front barrel retention bar 20, 20A, 20B, 20C, 20D, 20E, 20F to restrict forward movement of the barrel 30 as shown in FIG. 18 and FIG. 19.

Figure 20:
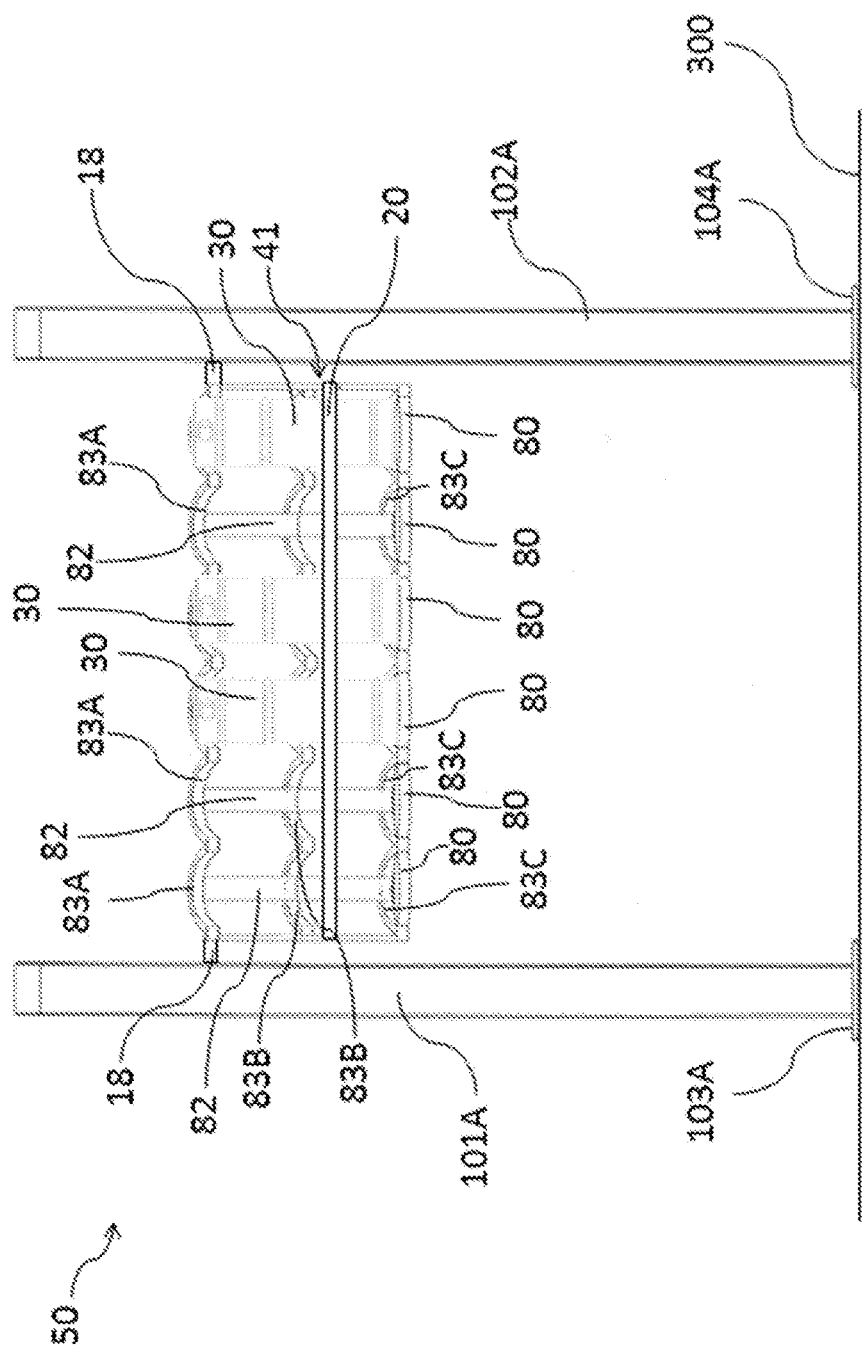
FIG. 20 illustrates a front elevation view of an example of a cradle of a vertical storage system according to various embodiments described herein.
Figure 21:
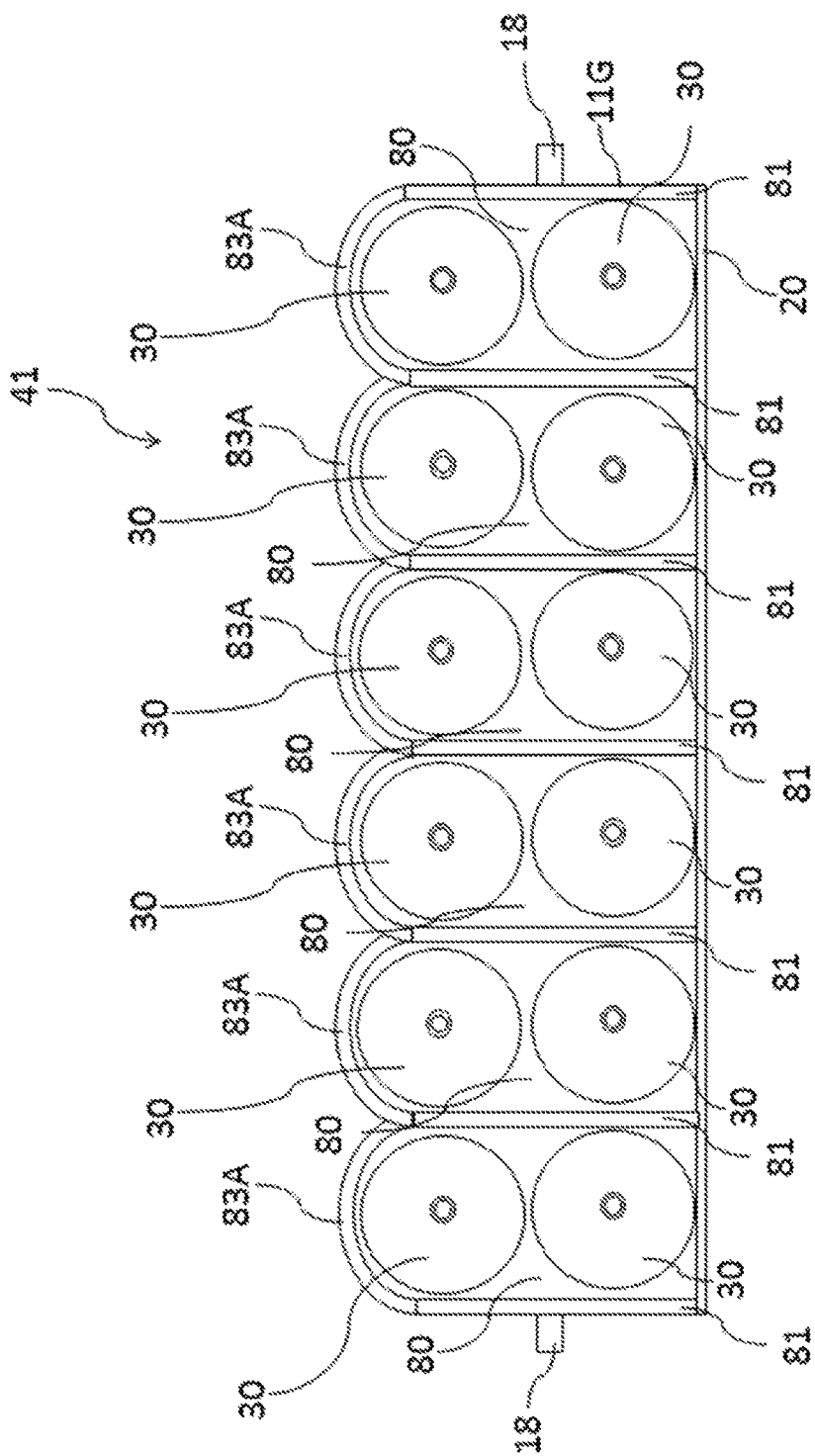
FIG. 21 shows a front elevation view of a cradle of a vertical storage system according to various embodiments described herein.
Figure 22:
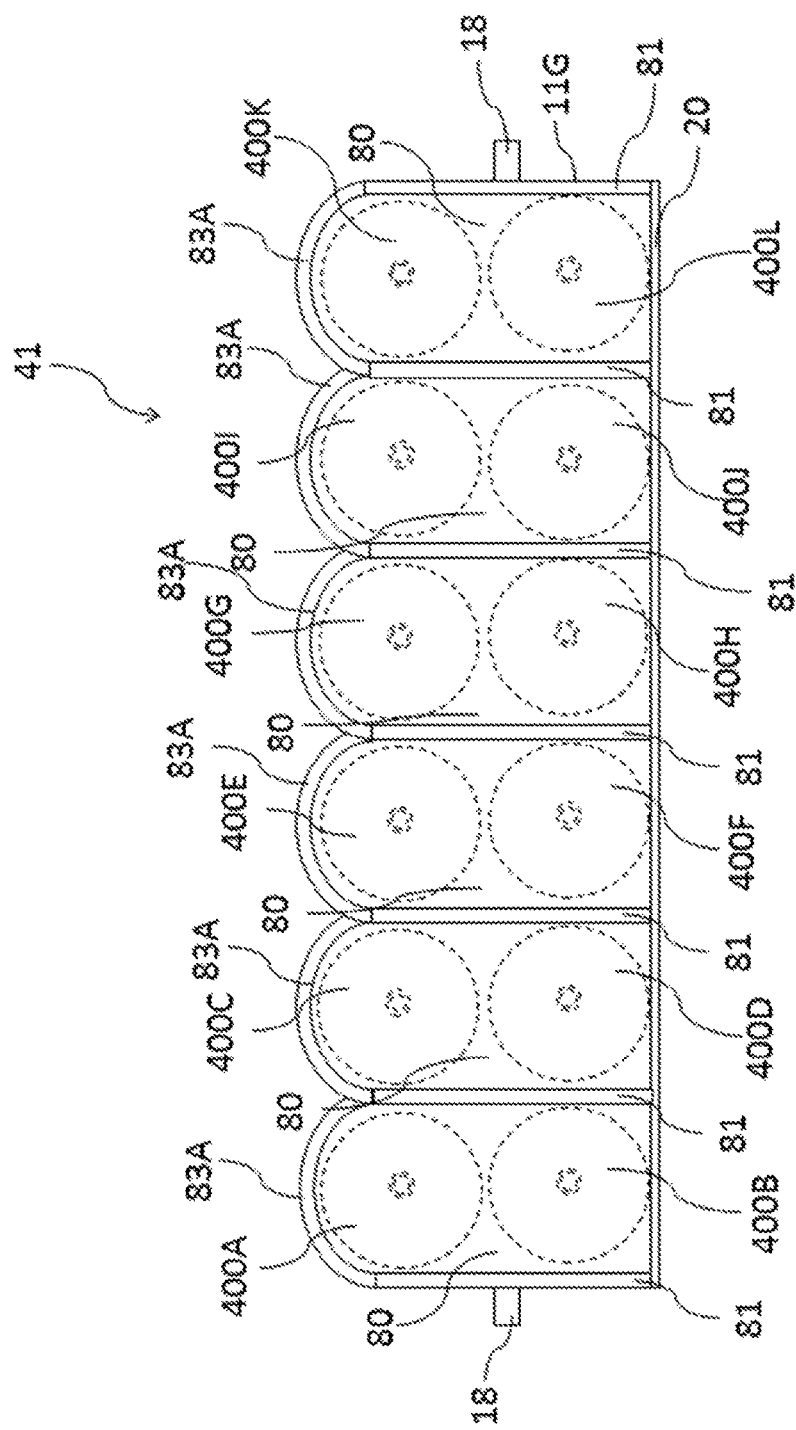
FIG. 22 depicts a front elevation view of a cradle of a vertical storage system according to various embodiments described herein.

Still referring to FIGS. 18-22, some alternative embodiments of a cradle 41 are provided. Optionally, a side containment bar 81 may function as or be coupled to a carrier load plate 60 (FIGS. 3-11, and 23). In FIG. 22 a first barrel position 400A and a second barrel position 400B are represented and each position forms a barrel receiving valley 42. Each barrel position 400A and 400B are shown in the same opening between side containment bar 81 with a barrel carrier plate 80 to transport the barrel(s) 30 vertically. This configuration allows for one, two, three, four or more barrels to be stored, picked and transported vertically in the same opening. In some embodiments, each barrel opening is engineered with a front barrel retention bar 20 to restrict forward movement of the barrel 30 as shown in FIG. 21.

Now turning to FIG. 20, an example is provided that illustrates a front perspective view of a vertical storage system 50 in accordance to one embodiment. In this example, a vertical storage system 50 is shown with three keg barrels 30 being carried in the third, forth, and sixth barrel position 400C, 400D, and 400F (FIG. 19) by a rotating barrel cradle apparatus 41. In some embodiments, the vertical storage system 50 is configured to removably secure a plurality of keg barrel(s) 30 in a vertical orientation and rotate the plurality of keg barrels 30 vertically allowing a user who may be posited at or near the ground 300 to access any keg barrel 30 secured by the cradle 41 within the vertical storage system 50.

Figure 23:
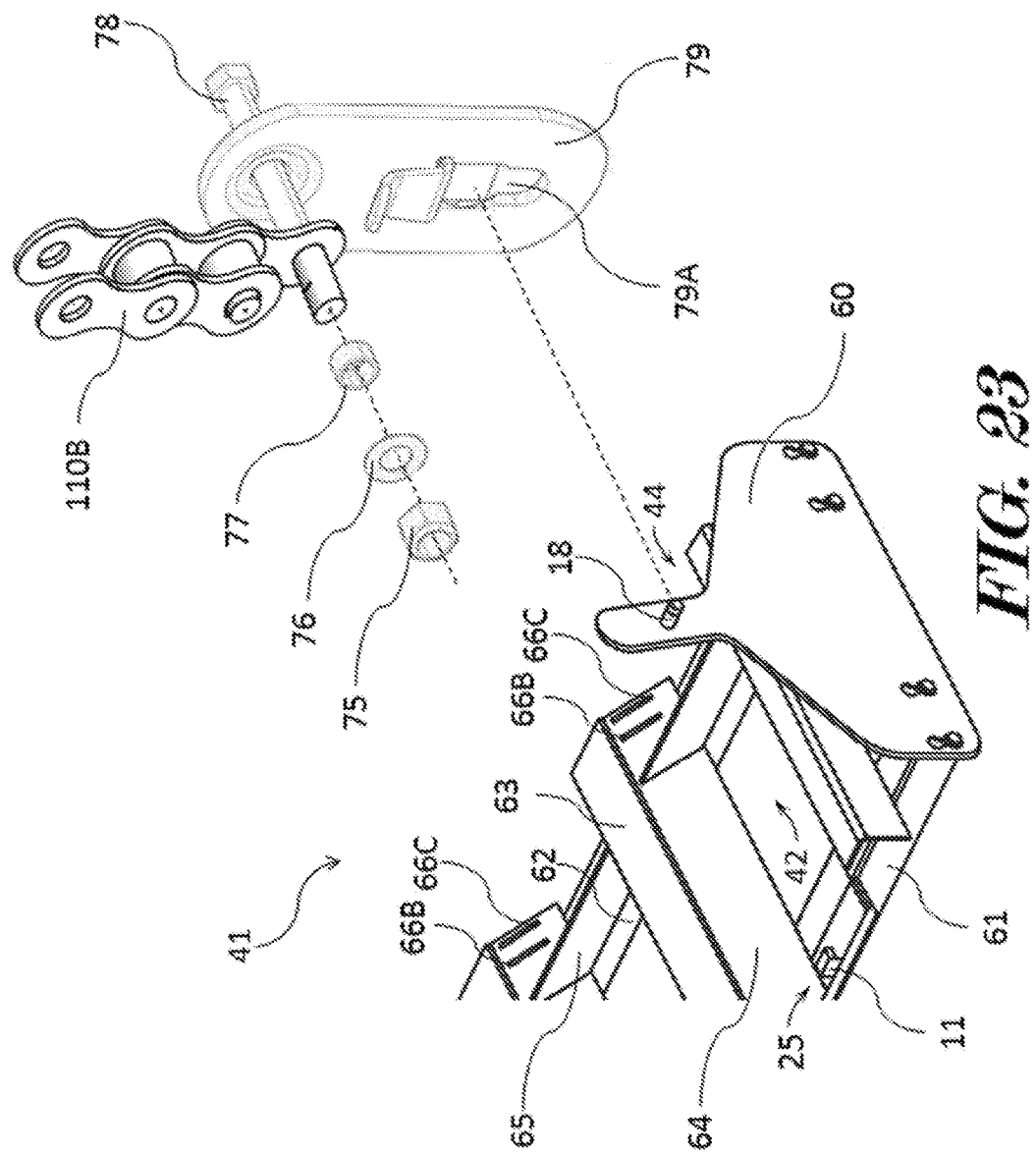
FIG. 23 illustrates a side perspective view of an example of the load bearing chain attachment mechanism for a cradle of a vertical storage system according to various embodiments described herein.

Referring now to FIG. 23, an example showing a second carrier chain 110B attachment mechanism for a cradle 41 of a vertical storage system 50 is provided. In this example, the cradle 41 is equipped with a horizontal front carrier load bar 61 and a back carrier load bar 62 that is attached to a vertical carrier load plate 60. The cradle load pin 18 in this example is designed to attach to the carrier coupling plate 79 by utilizing the carrier coupling plate slot 79A. In this example the second carrier chain 110B is equipped with a carrier bolt 78 that attaches the carrier coupling plate to the main load chain 110B. It is to be understood that the second carrier chain 110B attachment mechanism for a cradle 41 for a vertical storage system 50 barrel is not limiting and may have multiple designs based on intended applications. Furthermore, one of ordinary skill in the mechanical arts will understand that the opposite end of the cradle 41 may be connected to the first carrier load chain 110A in a similar fashion as described above.

While some materials have been provided, in other embodiments, the elements that comprise the vertical storage system 50 such as the support towers 151, 152, sprocket wheels 121A, 125A, 121B, 125B, carrier chains 110A, 110B, cradle 41, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the system 50 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the system 50 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the system 50 may be coupled by being one of connected to and integrally formed with another element of the system 50.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A rotating vertical storage system for barrels, the system comprising:
   a. a first vertical support tower having a first upper sprocket wheel and a first lower sprocket wheel with a first carrier chain rotationally coupled to said upper and lower first sprocket wheels;
   b. a second vertical support tower having a second upper sprocket wheel and a second lower sprocket wheel with a second carrier chain rotationally coupled to said upper and lower second sprocket wheels;
   c. a first cradle with a first end coupled to said first carrier chain and with a second end coupled to said second carrier chain, said cradle comprising a plurality of barrel receiving valleys adapted to removably secure a plurality of barrels, the first cradle mounted at an angled plane relative to a horizontal plane with the horizontal plane being generally parallel to a ground surface; and
   d. a motor operably connected to one of the first carrier chain and the second carrier chain with the first and second carrier chains configured to rotate the first cradle in a vertical direction.

2. The rotating vertical storage system of claim 1, further comprising a plurality of cradles with each cradle having a plurality of barrel receiving valleys adapted to removably secure a plurality of barrels.

3. The rotating vertical storage system of claim 2, further comprising a plurality of barrels removably secured within the plurality of barrel receiving valleys, said plurality of barrels vertically and horizontally oriented relative to each other and the system configured to vertically rotate each of the cradles in a vertical direction.

4. The rotating vertical storage system of claim 1, wherein the first cradle comprises a back restraint member configured to arrest the rearward movement of a barrel when placed within a barrel receiving valley of the first cradle.

5. The rotating vertical storage system of claim 1, wherein the first cradle comprises a front restraint member configured to arrest the forward movement of a barrel when placed within a barrel receiving valley of the first cradle.

6. The rotating vertical storage system of claim 5, wherein the front restraint member comprises a lip configured to engage with a rim of a barrel.

7. The rotating vertical storage system of claim 1, wherein the cradle comprises a plurality of lateral barrel restraints configured to arrest the lateral movement of a barrel, each lateral barrel restraint forming a lateral perimeter wall of a barrel receiving valley.

8. The rotating vertical storage system of claim 7, wherein the lateral barrel restraints are positioned at non-right angles relative to a horizontal front carrier load bar thereby forming lateral perimeter walls of the barrel receiving valleys.

9. A method for vertically storing a plurality of barrels, the method comprising:
   a. providing a first vertical support tower secured to a ground surface and having a first upper sprocket wheel and a first lower sprocket wheel with a first carrier chain rotationally coupled to said upper and lower first sprocket wheels;
   b. providing a second vertical support tower secured to the ground surface and having a second upper sprocket wheel and a second lower sprocket wheel with a second carrier chain rotationally coupled to said upper and lower second sprocket wheels;
   c. providing a first cradle with a first end coupled to said first carrier chain and with a second end coupled to said second carrier chain, said first cradle comprising a plurality of barrel receiving valleys being adapted to removably secure a plurality of barrels in a tilted orientation relative to a horizontal plane so that a first end of the barrel is raised above a second lower end of the barrel and the horizontal plane is generally parallel to the ground;
   d. providing a motor operably connected to the first carrier chain of said first vertical support tower;
   e. placing a first barrel into a barrel receiving valley of the first cradle wherein said first cradle is at a first height above the ground; and
   f. causing the motor to rotate the second carrier chain of said second vertical support tower and said first cradle so that said first cradle is moved to a second height above the ground surface.

10. The method of claim 9, wherein the first cradle comprises a back restraint member configured to arrest the rearward movement of a barrel when placed within a barrel receiving valley of the first cradle.

11. The method of claim 9, wherein the first cradle comprises a front restraint member configured to arrest the forward movement of the first barrel when placed within a receiving valley of the first cradle.

12. The method of claim 11, wherein the front restraint member comprises a lip configured to engage with a rim of the first barrel.

13. The method of claim 9, wherein the first cradle comprises a plurality of lateral barrel restraints configured to arrest lateral movement of a barrel.

14. The method of claim 13, wherein the lateral barrel restraints are configured to contact a barrel at non-right angles to accept the rounded wall of a barrel.

15. The method of claim 13, wherein the plurality of lateral barrel restraints are selected from one of contoured shaped and angled shaped and wherein the plurality of lateral barrel restraints are oriented at non-right angles relative to a horizontal front carrier load bar.

* * * * *